(12) United States Patent
Seitz et al.

(10) Patent No.: US 9,984,528 B2
(45) Date of Patent: May 29, 2018

(54) USING ANTENNA REFLECTION COEFFICIENTS TO DETECT EVENTS IN A GAMING ENVIRONMENT

(71) Applicant: Magnet Consulting, Inc., Incline Village, NV (US)

(72) Inventors: Forrest S. Seitz, Beaverton, OR (US); Joshua K. Hoyt, Portland, OR (US); Bartley A. Johnson, West Linn, OR (US)

(73) Assignee: Magnet Consulting, Inc., Incline Village, NV (US)

( * ) Notice: Subject to any disclaimer, the term of this patent is extended or adjusted under 35 U.S.C. 154(b) by 0 days. days.

(21) Appl. No.: 15/089,236

(22) Filed: Apr. 1, 2016

(65) Prior Publication Data
US 2016/0217645 A1 Jul. 28, 2016

Related U.S. Application Data

(63) Continuation-in-part of application No. 14/942,329, filed on Nov. 16, 2015.

(60) Provisional application No. 62/092,744, filed on Dec. 16, 2014.

(51) Int. Cl.
| | | |
|---|---|---|
| A63F 9/24 | (2006.01) | |
| A63F 13/00 | (2014.01) | |
| G06F 17/00 | (2006.01) | |
| G06F 19/00 | (2018.01) | |
| G07F 17/32 | (2006.01) | |
| G06K 7/10 | (2006.01) | |
| G07F 7/10 | (2006.01) | |
| G06K 17/00 | (2006.01) | |

(52) U.S. Cl.
CPC ...... *G07F 17/3209* (2013.01); *G06K 7/10128* (2013.01); *G06K 7/10356* (2013.01); *G06K 7/10465* (2013.01); *G07F 7/10* (2013.01); *G07F 17/3225* (2013.01); *G06K 2017/0067* (2013.01)

(58) Field of Classification Search
CPC ............ G07F 17/3209; G07F 17/3225; G06K 7/10128; G06K 7/10356; G06K 7/10465; G06K 2017/0067; G06F 7/10
USPC ......................................................... 463/39
See application file for complete search history.

(56) References Cited

U.S. PATENT DOCUMENTS

| | | | |
|---|---|---|---|
| 5,735,742 A * | 4/1998 | French | G07F 17/32 273/138.2 |
| 7,249,711 B1 | 7/2007 | Steinbrecher | |
| 8,734,245 B2 | 5/2014 | Kelly et al. | |

(Continued)

FOREIGN PATENT DOCUMENTS

| | | |
|---|---|---|
| CN | 101443795 A | 5/2009 |
| CN | 103020562 A | 4/2013 |

(Continued)

*Primary Examiner* — Omkar Deodhar
*Assistant Examiner* — Wei Lee
(74) *Attorney, Agent, or Firm* — Fountainhead Law Group P.C.

(57) ABSTRACT

A gaming table includes a network analyzer. The network analyzer detects antenna reflection coefficients faster than RFID tags can be read, enabling game state information to be monitored quickly. The network analyzer detects changes in the reflection coefficients that result from movements of a human appendage, enabling the system to change game states in response to the detected hand movements.

24 Claims, 18 Drawing Sheets

(56) References Cited

U.S. PATENT DOCUMENTS

| | | | |
|---|---|---|---|
| 2003/0062907 A1* | 4/2003 | Nevermann | G01D 5/48 324/637 |
| 2004/0214642 A1* | 10/2004 | Beck | A63F 13/327 463/40 |
| 2008/0200256 A1* | 8/2008 | Gagner | G07F 17/323 463/42 |
| 2009/0179740 A1 | 7/2009 | Pillai et al. | |
| 2009/0179741 A1 | 7/2009 | Hoyt et al. | |
| 2009/0253385 A1* | 10/2009 | Dent | H04B 1/0458 455/83 |
| 2009/0267742 A1* | 10/2009 | Hecht | G07F 17/322 340/10.1 |
| 2010/0176924 A1 | 7/2010 | Seitz et al. | |
| 2015/0141126 A1 | 5/2015 | Hoyt et al. | |

FOREIGN PATENT DOCUMENTS

| | | |
|---|---|---|
| CN | 103649767 A | 3/2014 |
| EP | 1788534 A2 | 5/2007 |
| JP | 2004080600 A | 3/2004 |
| TW | 201208748 A1 | 3/2012 |
| WO | 2007133851 A1 | 11/2007 |
| WO | 2011066593 A1 | 6/2011 |

\* cited by examiner

USING ANTENNA REFLECTION COEFFICIENTS TO DETECT EVENTS IN A GAMING ENVIRONMENT

CROSS REFERENCE TO RELATED APPLICATIONS

This application is a continuation-in-part of U.S. application Ser. No. 14/942,329 for "Using Antenna Reflection Coefficients to Detect Events in a Gaming Environment" filed Nov. 16, 2015, which claims the benefit of U.S. Provisional App. No. 62/092,744 for "Using Antenna Reflection Coefficients to Detect Events in a Gaming Environment" filed Dec. 16, 2014; both of which are incorporated herein by reference.

BACKGROUND

The present invention relates to gaming, and in particular, to detecting events in a gaming environment using antenna reflection coefficients.

Unless otherwise indicated herein, the approaches described in this section are not prior art to the claims in this application and are not admitted to be prior art by inclusion in this section.

A gaming environment may implement radio-frequency identification technology to track gaming tokens or other objects related to the games. For example, U.S. Pat. No. 8,432,283 describes a gaming table with multiple antennas, where each antenna is associated with a betting spot on a gaming table. Gaming tokens (that contain radio frequency identification (RFID) tags) may be placed on a betting spot and may be read by an RFID reader using the antenna associated with that betting spot.

SUMMARY

One issue with existing systems is that they are often require manual intervention to detect and process events. One common way to perform event monitoring is for a person to watch a gaming table via a remote camera.

Given the above, embodiments are directed toward improving the ability of the system to detect and process events.

According to an embodiment, a system detects events in a gaming environment. The system includes an antenna, a network analyzer device, and a control device. The antenna is positioned on a gaming table. The network analyzer device is coupled to the antenna and is configured to detect reflection coefficients that are associated with the antenna. The reflection coefficients change as a human appendage interacts with the antenna. The control device is coupled to the network analyzer device and is configured to control a game state related to the gaming table in the gaming environment in response to the change in the reflection coefficients.

The reflection coefficients may change from a first state to a second state when the human appendage moves from outside the antenna to inside the antenna, or vice versa. The control device may control the game state according to the reflection coefficients switching between the first state and the second state.

The human appendage may interacts with the antenna by passing over the antenna on the gaming table.

The reflection coefficients may also change as both the human appendage and an object interact with the antenna, where a gaming object includes the object. The object may be a metallized layer in a playing card, or a tuned circuit in a dealer wristband.

The system may further include a radio frequency identification (RFID) reader device that is configured to selectively energize the antenna and to read identifiers of RFID tags that are nearby to the antenna. The control device is configured to control the game state in response to the change in both the reflection coefficients and the identifiers.

The antenna may have a single loop, rectangular shape or a double loop, figure eight shape.

The control device may store a baseline set of reflection coefficients, where the control device periodically controls the network analyzer to acquire a new baseline set of reflection coefficients, and where the control device updates the baseline set of reflection coefficients with the new baseline set of reflection coefficients.

The network analyzer device may operate between 13 and 14 MHz.

The game state may be one of a plurality of game states, and the antenna may be one of a number of antennas positioned on the gaming table. The antennas are respectively associated with a number of locations. The control device is configured to associate each of the locations with a corresponding one of the game states in response to the change in the reflection coefficients for a corresponding one of the antennas. For example, a card dealt to Position 1 changes the game state to one state for Position 1, and a card dealt to Position 2 changes the game state to another state for Position 2.

According to an embodiment, a method detects events in a gaming environment. The method includes detecting reflection coefficients that are associated with an antenna positioned on a gaming table. The reflection coefficients change as a human appendage interacts with the antenna. The method further includes controlling a game state related to the gaming table in the gaming environment in response to the change in the reflection coefficients.

The method may further include selectively energizing the antenna, and reading identifiers of RFID tags that are nearby to the antenna, where controlling the game state comprises controlling the game state in response to the change in both the reflection coefficients and the identifiers.

The method may further include storing a baseline set of reflection coefficients, periodically acquiring a new baseline set of reflection coefficients, and updating the baseline set of reflection coefficients with the new baseline set of reflection coefficients.

According to an embodiment, a method detects events in a gaming environment. The method includes detecting reflection coefficients that are associated with antennas positioned on a gaming table. The antennas are respectively associated with locations on the gaming table. The reflection coefficients change as a human appendage interacts with the antennas. The method further includes controlling game states related to the gaming table in the gaming environment in response to the change in the reflection coefficients. Each of the locations is associated with a corresponding one of the game states in response to the change in the reflection coefficients for a corresponding one of the antennas.

The following detailed description and accompanying drawings provide a further understanding of the nature and advantages of embodiments of the present invention.

DETAILED DESCRIPTION

Described herein are techniques for using antenna reflection coefficients to detect actions on a gaming table. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

Figure 1:
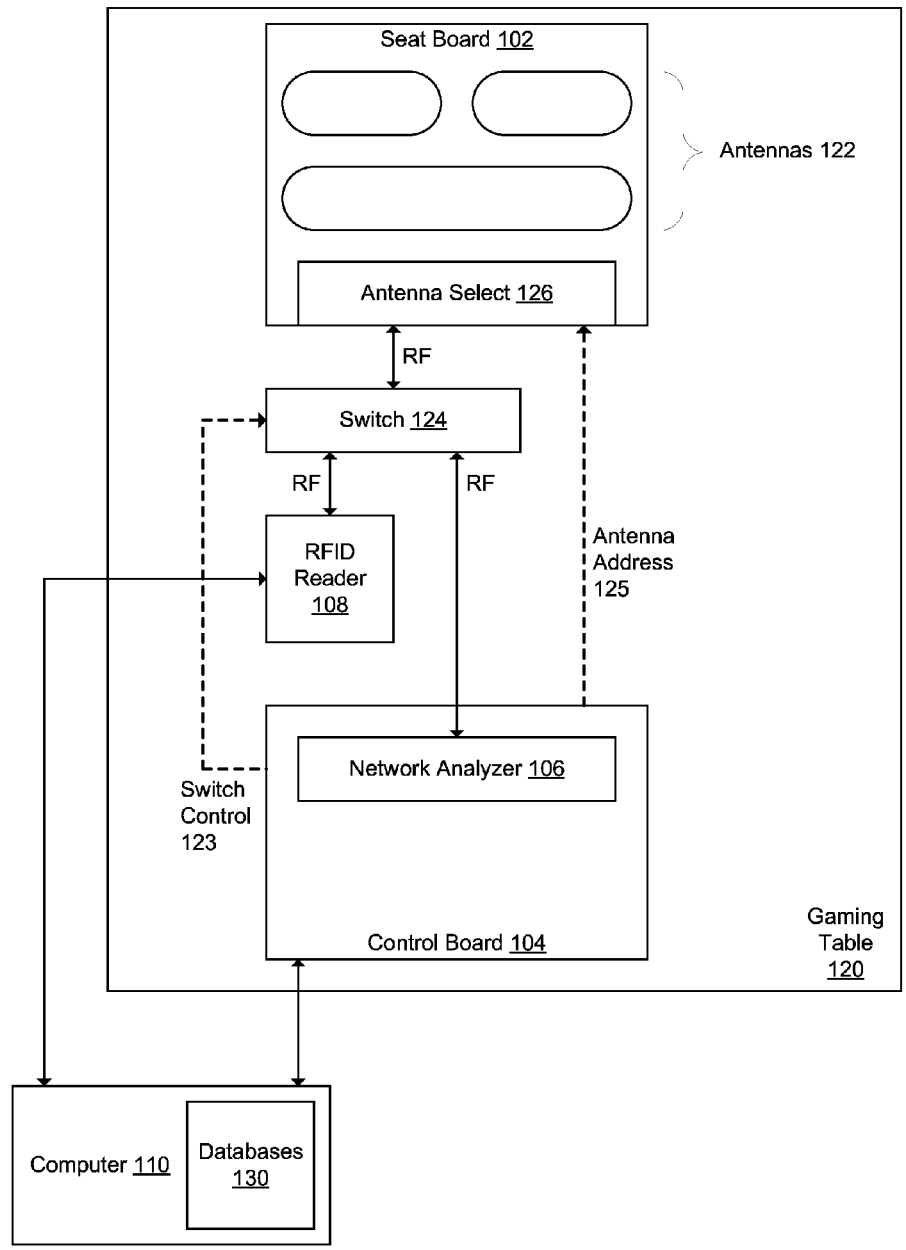
FIG. 1 is a block diagram of a system 100 for detecting events in a gaming environment.

FIG. 1 is a block diagram of a system 100 for detecting events in a gaming environment. In FIG. 1, the dotted connectors indicate the flow of control information, and solid lines indicate the flow of data or the flow of both data and control information. Note that such illustration of a connector as either dotted or solid is provided for clarity of description, and does not necessarily indicate that the connection is exclusive to either control information or data.

The system 100 includes a seat board 102, a control board 104, a network analyzer device 106 (also referred to as the network analyzer 106), a radio frequency identification (RFID) reader device 108 (also referred to as the RFID reader 108), and a computer 110. The seat board 102, control board 104, network analyzer 106, and RFID reader 108 may be components of a gaming table 120. The computer 110 may connect to the gaming table 120 with a local area network (LAN) connection, e.g. Ethernet LAN (Institute of Electrical and Electronics Engineers IEEE 802.3 standard). The computer 110 may be located remote from the gaming table 120, and may connect to multiple gaming tables (not shown). The computer 110 may connect to other computers (not shown) that collectively perform the functions of the computer 110 discussed below.

The seat board 102 is generally located on a top surface of the gaming table 120 and generally functions as the area in which gaming objects are placed. Gaming objects include gaming tokens, cards, tiles, dice, etc. The seat board 102 includes one or more antennas 122 that couple to RFID tags in the gaming objects as the gaming objects are placed on, moved, or removed from the area associated with the seat board 102. (One of the antennas 122 may be referred to as a selected antenna 122, a particular antenna 122, or a corresponding antenna 122.) Each of the antennas 122 is associated with a corresponding area on the gaming table 120, allowing the system 100 to energize a particular antenna and to detect the gaming objects that are located at the area associated with that particular antenna. The term "betting area" may be used to refer to the area on the seat board 102 in which gaming tokens are placed when making or paying out bets. The term "stash area" may be used to refer to an area on the seat board 102 in which gaming tokens not currently involved in the game play may be placed. The seat board 102 may include a player stash area that is associated with a player (or other patron of the gaming environment), or a dealer stash area that is associated with a dealer (or other employee of the gaming environment). The term "geofence" (or "geofencing") may be used to refer to an area on the seat board 102 that detects a gaming object related to a game state. The number, size, shape, and location of the antennas 122 may be adjusted as desired, for example to increase the number of betting areas. The seat board 102 may be implemented using a printed circuit board that has the antennas 122 or other circuit structures printed or attached.

The control board 104 generally controls the interaction between the seat board 102 and the network analyzer 106, the RFID reader 108, and the computer 110. The control board 104 controls a switch 124 using switch control information 123. The switch 124 selectively connects one of the network analyzer 106 and the RFID reader 108 to the seat board 102 for the transmission of radio frequency (RF) energy. The switch 124 may be implemented with a multiplexer circuit. Alternatively, the switch 124 may be a component of the seat board 102.

The control board 104 also sends antenna address information 125 to an antenna selection circuit 126, to control which of the antennas 122 is selectively connected to the switch 124. The antenna selection circuit 126 may be implemented with a multiplexer circuit.

The control board 104 also interacts with the computer 110 to receive the antenna address information 125, and to return the measurement data generated by the network analyzer 106 for the selected antenna 122. The control board 104 may be implemented using a printed circuit board that has the network analyzer 106, a processor, a memory, or other circuit structures printed or attached.

The network analyzer 106 generally measures the reflection coefficient of a selected antenna 122 by energizing the selected antenna 122 with radio frequency (RF) energy. The reflection coefficient may also be referred to as the reflectance. The term "reflection coefficients" may be used to refer to more than one reflection coefficient, for example the reflection coefficients at different times for a single antenna, the reflection coefficients at different frequencies for a single antenna, or the reflection coefficients for more than one antenna. The term "reflection coefficients" may also be used to refer to the components of a single reflection coefficient, such as the rho and theta values (or I and Q values, etc.) corresponding to a single reflection coefficient measurement.

As gaming objects interact with (also referred to as "couple to" or "couple with") a particular antenna 122, the reflection coefficient may change. For example, when the network analyzer 106 sends radio frequency energy to a selected antenna 122 that has no gaming objects coupled therewith, a first reflection coefficient results. When one or more gaming objects then come into the vicinity of the selected antenna 122 (e.g., by being placed on the betting spot associated with the selected antenna 122), a second reflection coefficient results when the network analyzer 106 sends radio frequency energy to the selected antenna 122 due to the gaming objects coupling with the selected antenna 122. When some, but not all, of the gaming objects are removed from the vicinity of the selected antenna 122 (e.g., by being removed from the betting spot), a third reflection coefficient results when the network analyzer 106 sends radio frequency energy to the selected antenna 122 due to there being fewer gaming objects coupling with the selected antenna 122. By comparing the reflection coefficients, the system 100 can detect events such as gaming objects being placed on, removed from, or otherwise interacting with the gaming table 120. The network analyzer 106 may be implemented using a circuit such as a network analyzer chip.

The RFID reader 108 generally reads the RFID tags in gaming objects that are in the vicinity of a selected antenna 122 by energizing the selected antenna 122 with radio frequency (RF) energy. In one implementation, the RFID reader 108 generates the energy at 13.56 MHz. Each of the RFID tags that receives the energy responds with its corresponding unique identifier. The RFID reader 108 then sends the received identifiers to the computer 110.

The computer 110 generally receives the reflection coefficients obtained by the network analyzer 106, receives the identifiers of the gaming objects read by the RFID reader 108, and performs further processing based on the reflection coefficients or the identifiers. The computer 110 includes various databases 130. The databases 130 may include a reflection coefficients database, a tag database and a game rules database.

The computer 110 uses the reflection coefficients database to store sets of reflection coefficients in order to detect when they change for a selected antenna 122. For example, for a selected antenna 122, the reflection coefficients database may store a baseline set (e.g., which corresponds to no gaming objects near the selected antenna 122); the computer 110 uses the baseline set to compare to the current set for the selected antenna 122, in order to detect that the selected antenna is no longer at baseline (e.g., gaming objects are now coupling to the selected antenna 122). As another example, for a selected antenna 122, the reflection coefficients database may store a previous set (e.g., which corresponds to a previous measurement of the reflection coefficients for the selected antenna 122); the computer 110 uses the previous set to compare to the current set for the selected antenna 122, in order to detect the change in the reflection coefficients. Once the computer 110 detects the change in the reflection coefficients for a particular antenna 122, the computer 110 controls the RFID reader 108 to perform a read on that particular antenna 122.

The computer 110 uses the tag database to verify that the identifiers received from the RFID reader 108 correspond to valid tags, and to correspond those identifiers to other information such as the value of the gaming objects, etc. For example, for a gaming token, the value may be $1, $10, $100, etc. As another example, for a gaming card, the value may be the two of hearts, the three of spades, etc.

The computer 110 uses the game rule database to control a game state related to the gaming table 120. For example, the game rules may prohibit bets from being changed during a defined period; when the computer 110 detects the reflection coefficients for a selected antenna 122 change during that defined period, the computer 110 may generate an alert. As another example, the game rules may define a transition from one state to another state when the dealer moves a gaming object into a particular area; when the computer 110 detects the change in the reflection coefficients for the antenna 122 that corresponds to the particular area, the computer 110 may change the game state.

In general, the network analyzer 106 takes between 0.25 and 0.45 milliseconds to obtain the reflection coefficients for one of the antennas 122, and the RFID reader 108 takes between 5 and 10 milliseconds to read the RFID tags near a particular antenna. For the RFID reader 108, the read time increases as the number of RFID tags in the read area increases. But for the network analyzer 106, the time to obtain a set of reflection coefficients is mainly dependent upon the number of reflection coefficients in the set. As detailed further below, the system 100 uses these time differences to perform a high rate of obtaining reflection coefficients with the network analyzer 106, to detect which sets of reflection coefficients change for one or more particular antennas 122, and then to read with the RFID reader 108 only those one or more particular antennas 122 that have the changed sets of reflection coefficients. In this manner, read time savings can be achieved, since the system 100 does not have to read all of the antennas 122.

In general, the control board 104 and the computer 110 may be referred to as a control device. The RFID reader 108 may also be considered part of the control device, for example when the computer 110 controls the RFID reader 108 to energize a selected antenna 122 or to perform a read of the selected antenna 122. Further details of the system 100 are provided below.

Figure 2B:
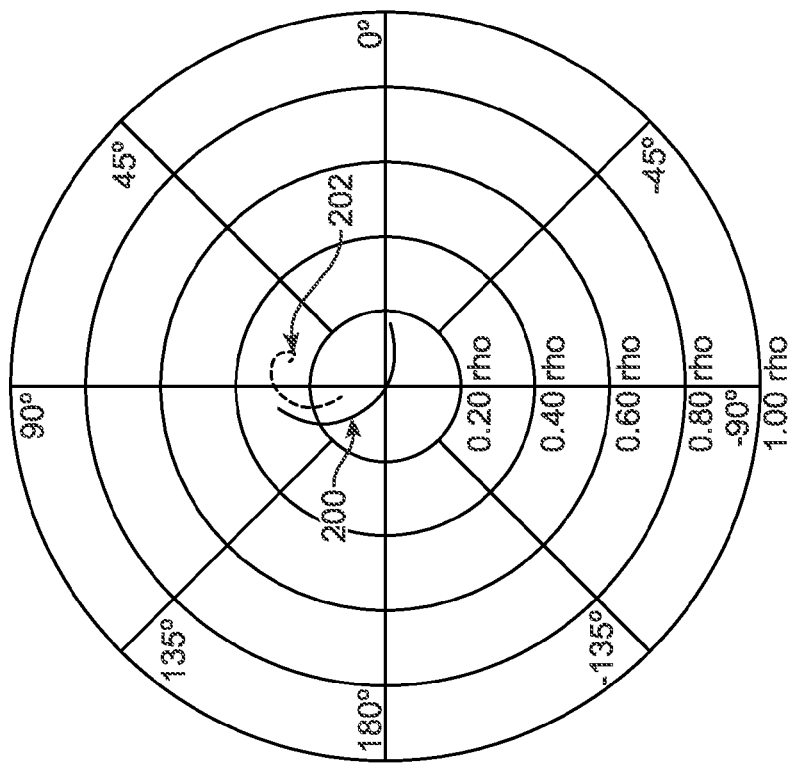
FIGS. 2A, 2B, 2C, 2D and 2E are polar diagrams showing examples of reflection coefficient measurements by the network analyzer 106 (see FIG. 1) for one of the antennas 122.
Figure 2A:
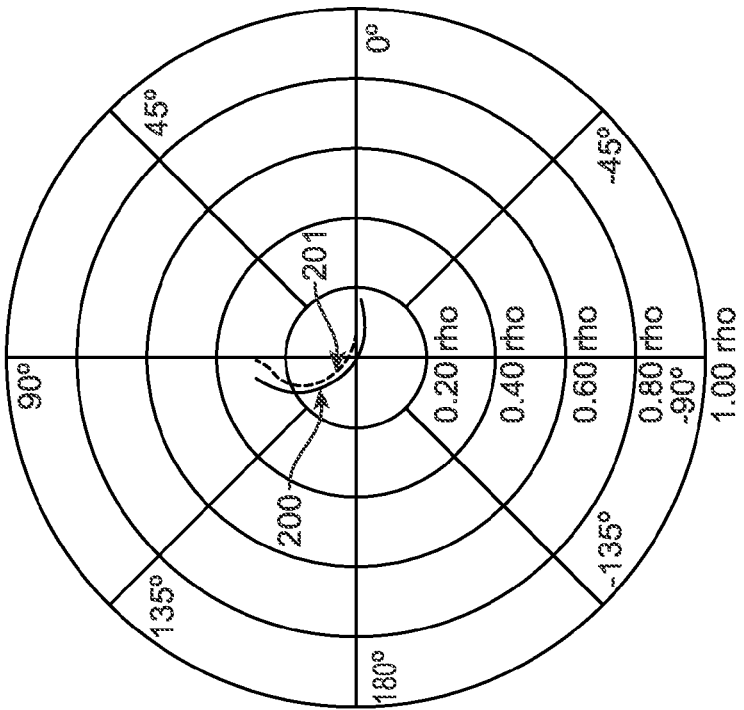
Figure 2D:
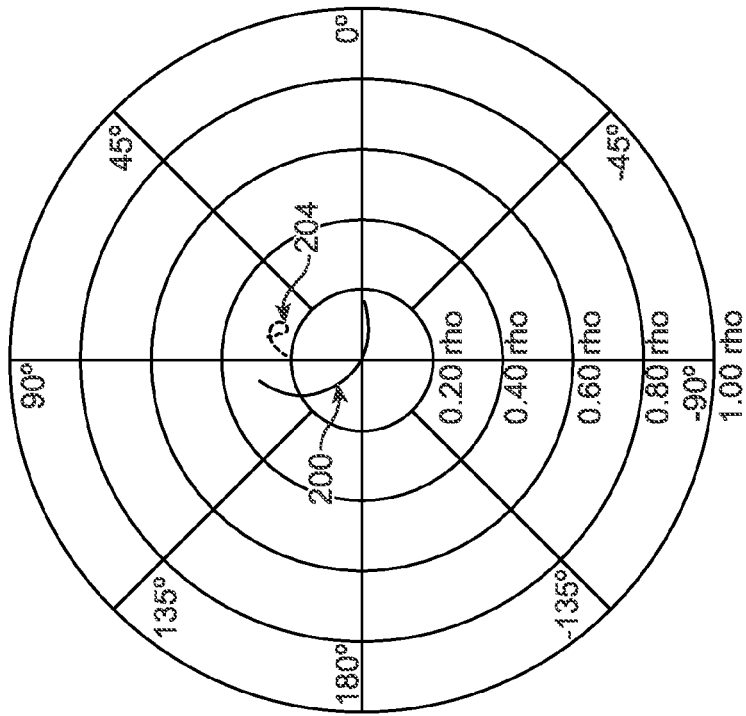
Figure 2C:
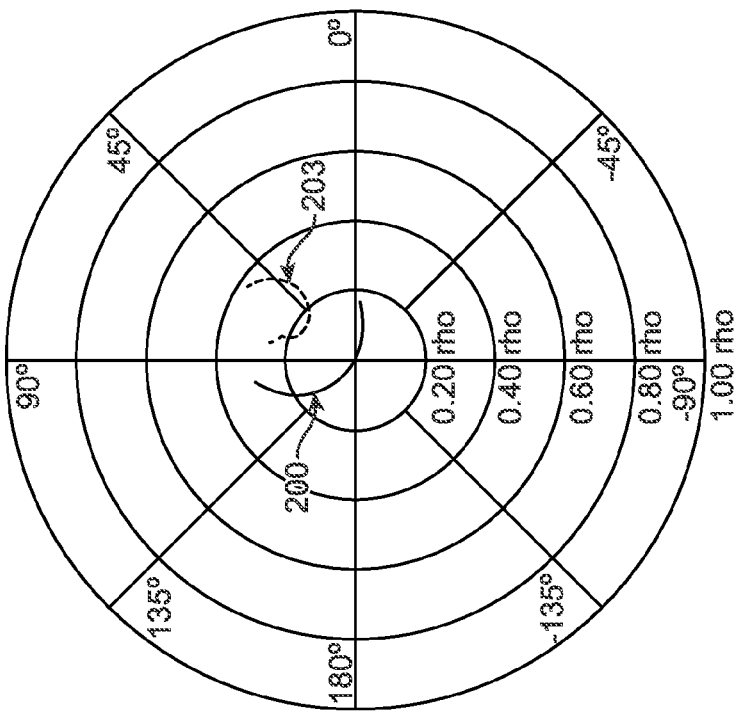
Figure 2E:
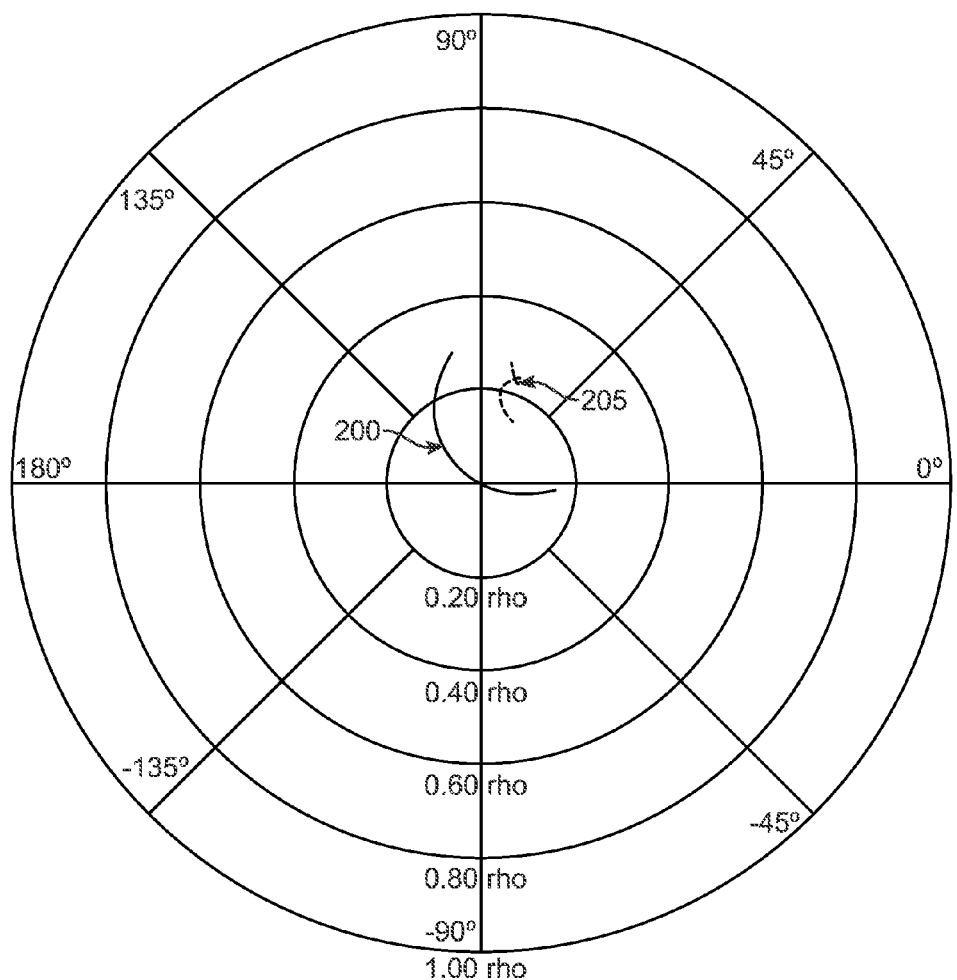

FIGS. 2A-2E are polar diagrams showing examples of reflection coefficient measurements by the network analyzer 106 (see FIG. 1) for one of the antennas 122. The polar diagrams are also applicable to the other systems described herein. Each of the polar diagrams of FIGS. 2A-2E shows the measurements made between 13.26 and 13.86 MHz. FIG. 2A shows the measured reflection coefficients for zero RFID tags (line 200) and one RFID tag (line 201). FIG. 2B shows the measured reflection coefficients for zero RFID tags (line 200) and five RFID tags (line 202). FIG. 2C shows the measured reflection coefficients for zero RFID tags (line 200) and ten RFID tags (line 203). FIG. 2D shows the measured reflection coefficients for zero RFID tags (line 200) and twenty RFID tags (line 204). FIG. 2E shows the measured reflection coefficients for zero RFID tags (line 200) and thirty RFID tags (line 205).

The computer 110 may store these measurements in the databases 130 (e.g., in the reflection coefficients database). The values stored may be polar values (e.g., magnitude and phase or rho and theta, as shown in FIGS. 2A-2E), x and y values, I and Q (in-phase and quadrature) values, scattering parameters ($S_{11}$ or $S_{22}$, e.g. as plotted on a Smith chart), etc. The computer 110 need not store a large set of values that correspond to one of the lines (e.g., the line 200). Instead, the computer 110 may store (for a particular antenna 122) a set of a few values, such as four, six, eight, ten, twelve, etc. The set of values may correspond to the baseline reflection coefficients, or to the previously measured reflection coefficients. The computer 110 may then detect the change in the reflection coefficients by comparing the baseline set and the currently measured set, or by comparing the previously measured set and the currently measured set. Alternatively, the computer 110 may store two sets of values (one set for the baseline reflection coefficients and another set for the previously measured reflection coefficients). The computer 110 may then detect the change in the reflection coefficients by comparing the currently measured set and either the baseline set or the previously measured set.

As another alternative, the control board 104 and network analyzer 106 (see FIG. 1) can detect the change in reflection coefficients. The control board 104 includes a memory that stores the baseline reflection coefficients for all the antennas 122 (see FIG. 1). When the network analyzer 106 obtains the currently measured reflection coefficients, the control board 104 compares these to the baseline in order to determine which of the antennas 122 have gaming objects associated therewith. The control board 104 then provides these corresponding antennas 122 to the computer 110, and the computer 110 instructs the RFID reader 108 (see FIG. 1) to read those corresponding antennas 122.

Further details on how the system 100 detects the changes are provided below.

Figure 3:
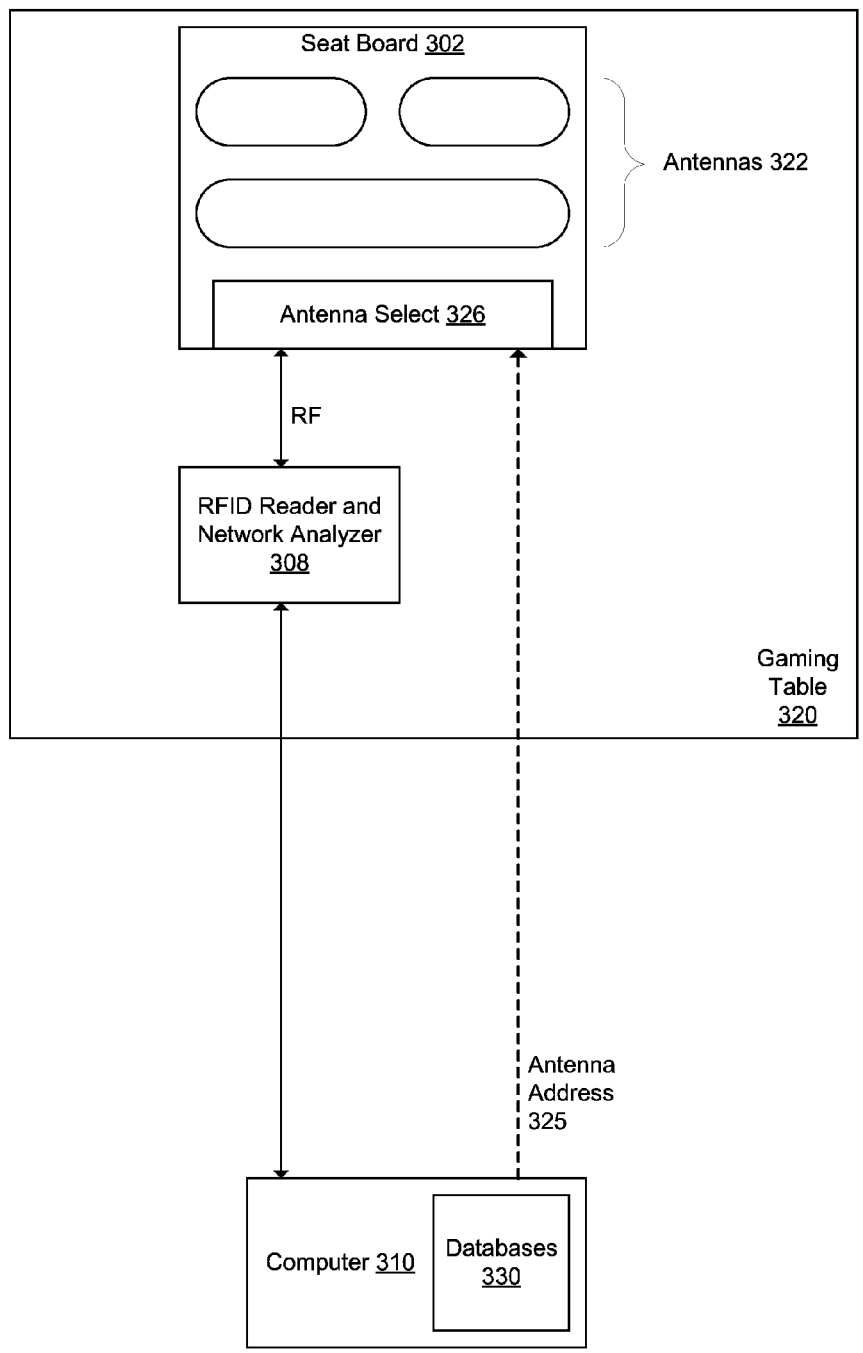
FIG. 3 is a block diagram of a system 300 for detecting events in a gaming environment.

FIG. 3 is a block diagram of a system 300 for detecting events in a gaming environment. The system 300 is similar to the system 100 (see FIG. 1), but having a combined RFID reader and network analyzer 308. The system 300 also includes a seat board 302 with one or more antennas 322 and an antenna selection circuit 326 (which are similar to the seat board 102, antennas 122 and antenna selection circuit 126 of FIG. 1); and a computer 310 storing databases 330 (which are similar to the computer 110 and databases 130 of FIG. 1). The computer 310 communicates antenna address information 325 to the seat board 302 (in a manner similar to the antenna address information 125 of FIG. 1).

The combined RFID reader and network analyzer 308 performs functions similar to those of the RFID reader 108 and network analyzer 106 of FIG. 1. For example, the detection process may be performed as follows. The computer 310 selects one of the antennas 322 using the antenna address information 325, and instructs the combined RFID reader and network analyzer 308 to perform its network analyzer function on the selected antenna 322. The combined RFID reader and network analyzer 308 sends the reflection coefficients resulting from analyzing the selected antenna 322 to the computer 310. The computer 310 compares the resulting reflection coefficients to the previous set of reflection coefficients or the baseline set of reflection coefficients for the selected antenna 322, for example by using the reflection coefficients database. When the computer 310 detects that the reflection coefficients have changed, the computer 310 instructs the combined RFID reader and network analyzer 308 to perform its RFID reader function on the selected antenna 322, and the combined RFID reader and network analyzer 308 sends the detected RFID tag identifiers to the computer 310. When the computer 310 detects that the reflection coefficients have not changed, the computer 310 selects another one of the antennas 322 for the network analyzer function, and the process repeats for that antenna; and so on.

Figure 4:
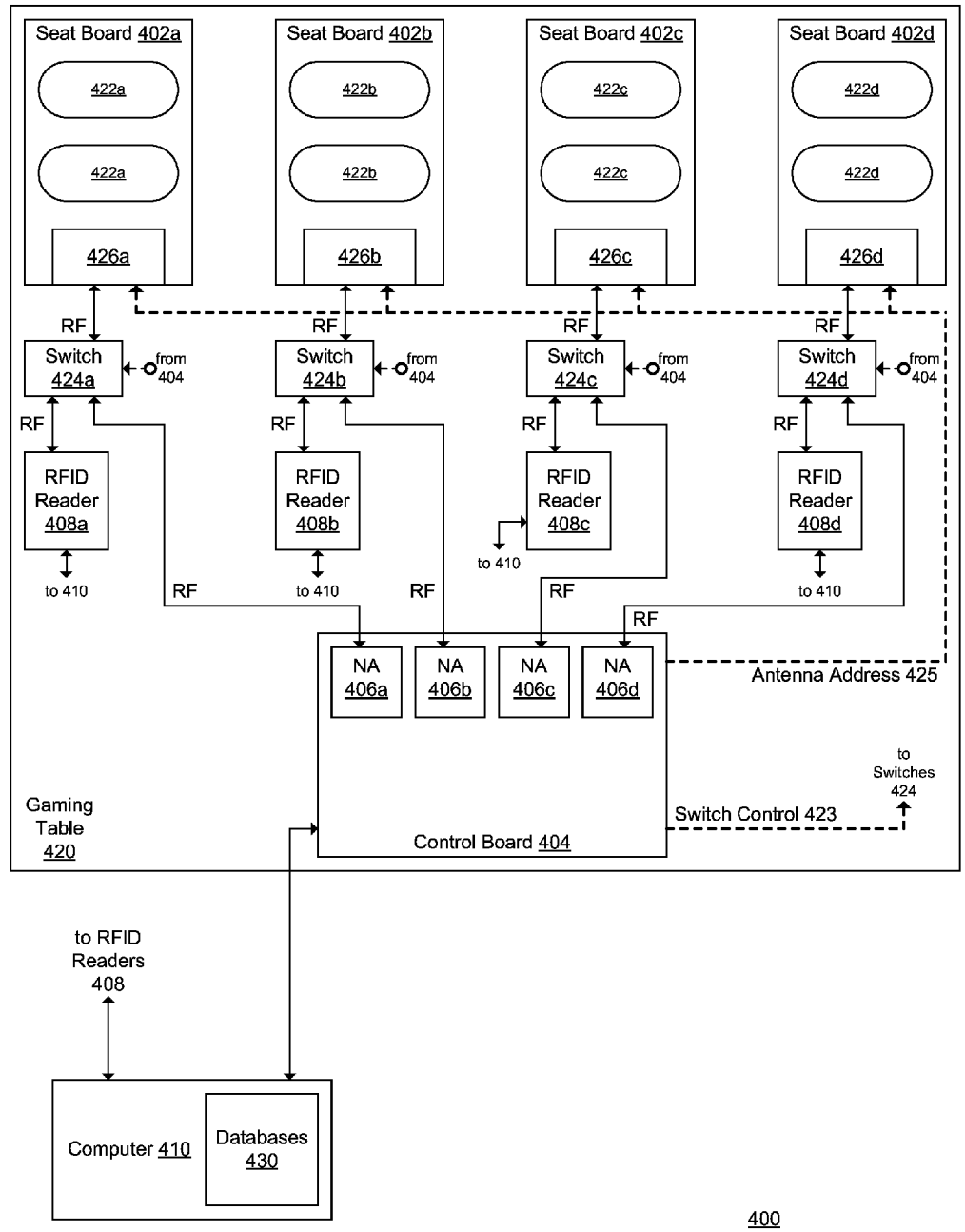
FIG. 4 is a block diagram of a system 400 for detecting events in a gaming environment.

FIG. 4 is a block diagram of a system 400 for detecting events in a gaming environment. The system 400 is similar to the system 100 (see FIG. 1), but with multiple seat boards 402a-402d (collectively 402). The seat boards 402 have antennas 422a-422d (collectively 422) and antenna selection circuits 426a-426d (collectively 426). The seat boards 402 are associated with multiple switches 424a-424d (collectively 424), multiple network analyzers (NA) 406a-406d (collectively 406), and multiple RFID readers 408a-408d (collectively 408). The seat boards 402 are associated with a control board 404. As with the multiple antennas 122 (see FIG. 1), one of the collective components may be referred to by number as the selected component, the particular component, or the corresponding component (e.g., "the corresponding switch 424" refers to a corresponding one of the switches 424). The seat boards 402, switches 424, RFID readers 408, and control board 404 (with the network analyzers 406) may be components of a gaming table 420 (similar to the gaming table 120 of FIG. 1). A computer 410 (similar to the computer 110 of FIG. 1), with databases 430 (similar to the databases 130 of FIG. 1), connects to the RFID readers 408 and the control board 404.

The number of seat boards 402 may be increased or decreased as desired. In general, each seat board 402 corresponds to one player position at the gaming table 420. The number, shape and size of the antennas 422 may be adjusted as desired. In general, each antenna 422 corresponds to an area in which gaming objects are read, such as a betting spot for gaming tokens. The antennas 422 may also include geofencing antennas, for example one geofence antenna per seat board 402.

The system 400 performs the detection process in a manner similar to that of the system 100 (see FIG. 1). The computer 410 selects one of the antennas 422 and sends the antenna address information 425 to the control board 404. The control board 404 determines which seat board 402, switch 424 and network analyzer 406 correspond to the selected antenna 422. The control board 404 uses the switch control information 423 to control the corresponding switch 424 to connect the corresponding network analyzer 406 to the corresponding seat board 402. The control board 404 sends the antenna address information 425 to the corresponding antenna selection circuit 426 of the corresponding seat board 402. The corresponding antenna selection circuit 426 receives the radio frequency scan from the corresponding network analyzer 406 and routes it to the selected antenna 422. The selected network analyzer 406 determines the reflection coefficients that result from scanning the selected antenna 422 with radio frequency (RF) energy and sends the reflection coefficients to the computer 410. The computer 410 determines whether the reflection coefficients have changed for the selected antenna 422. If the reflection coefficients have not changed, the computer 410 selects another antenna 422 and repeats the process of detecting the reflection coefficients for the new selected antenna 422.

When the computer 410 determines that the reflection coefficients have changed for the selected antenna 422, the computer 410 instructs the control board 404 to change the corresponding switch 424 to connect the corresponding RFID reader 408 to the selected antenna 422. The computer 410 instructs the corresponding RFID reader 408 to perform a read of the selected antenna 422 using RF energy. The corresponding RFID reader 408 sends the RFID identifiers resulting from the read to the computer 410. The computer then selects another antenna 422 and repeats the process of detecting the reflection coefficients.

Figure 5:
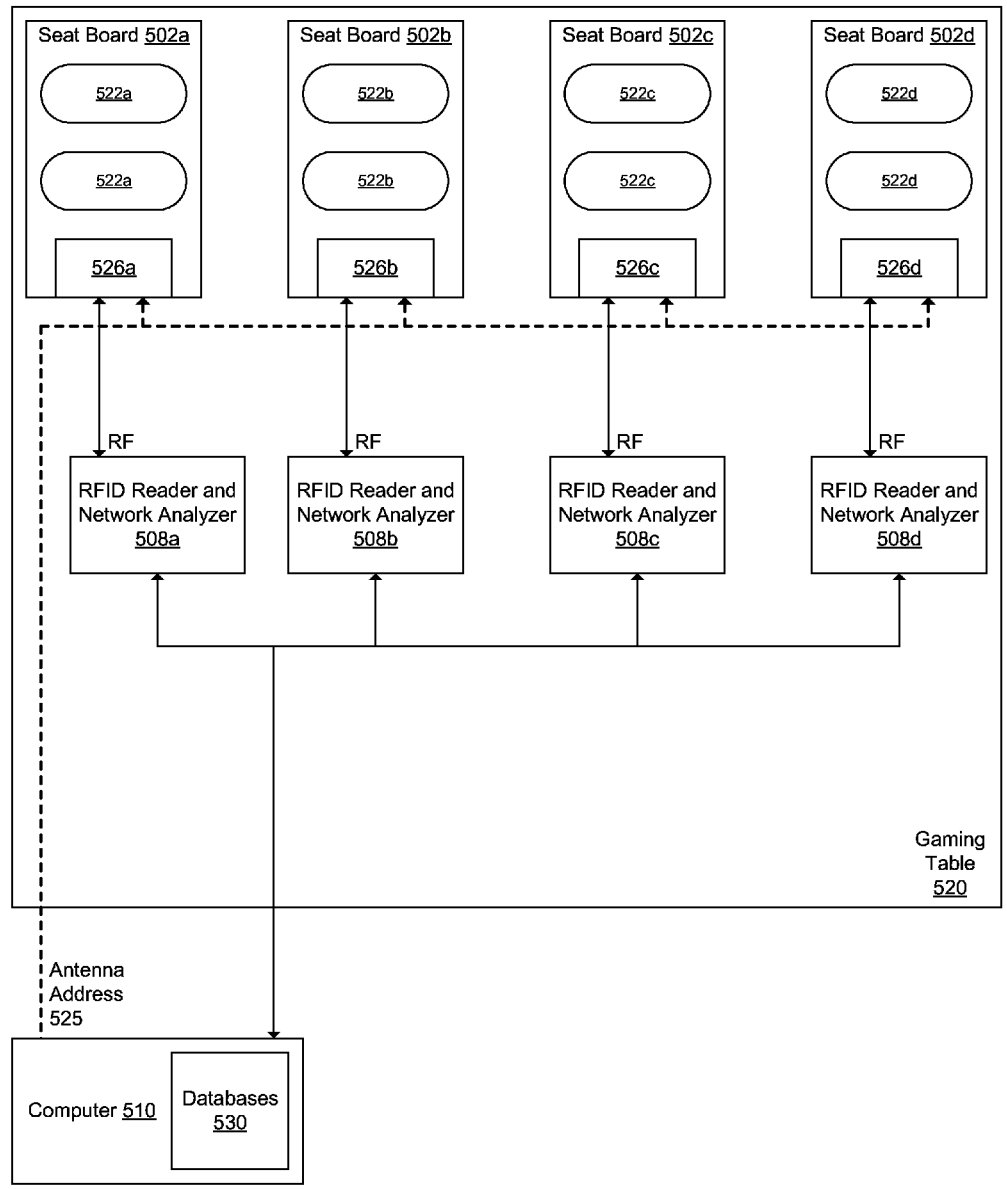
FIG. 5 is a block diagram of a system 500 for detecting events in a gaming environment.

FIG. 5 is a block diagram of a system 500 for detecting events in a gaming environment. The system 500 is similar to the system 300 (see FIG. 3), but with multiple seat boards 502a-502d (collectively 502). The seat boards 502 have antennas 522a-522d (collectively 522) and antenna selection circuits 526a-526d (collectively 526). The seat boards 502 are associated with multiple combined RFID readers and network analyzers 508a-508d (collectively 508), which are similar to the combined RFID reader and network analyzer 308 (see FIG. 3). The seat boards 502 and the combined RFID readers and network analyzers 508 may be components of a gaming table 520 (similar to the gaming table 320 of FIG. 3). A computer 510 (similar to the computer 310 of FIG. 3), with databases 530 (similar to the databases 330 of FIG. 3), connects to the combined RFID readers and network analyzers 508, and communicates antenna address information 525 to the seat boards 502 (in a manner similar to the antenna address information 325 of FIG. 3).

In general, the computer 510 controls each combined RFID reader and network analyzer 508 independently. Thus, some of the combined RFID readers and network analyzers 508 may be performing their network analyzer functions, at the same time others of the combined RFID readers and network analyzers 508 may be performing their RFID reader functions.

Figure 6:
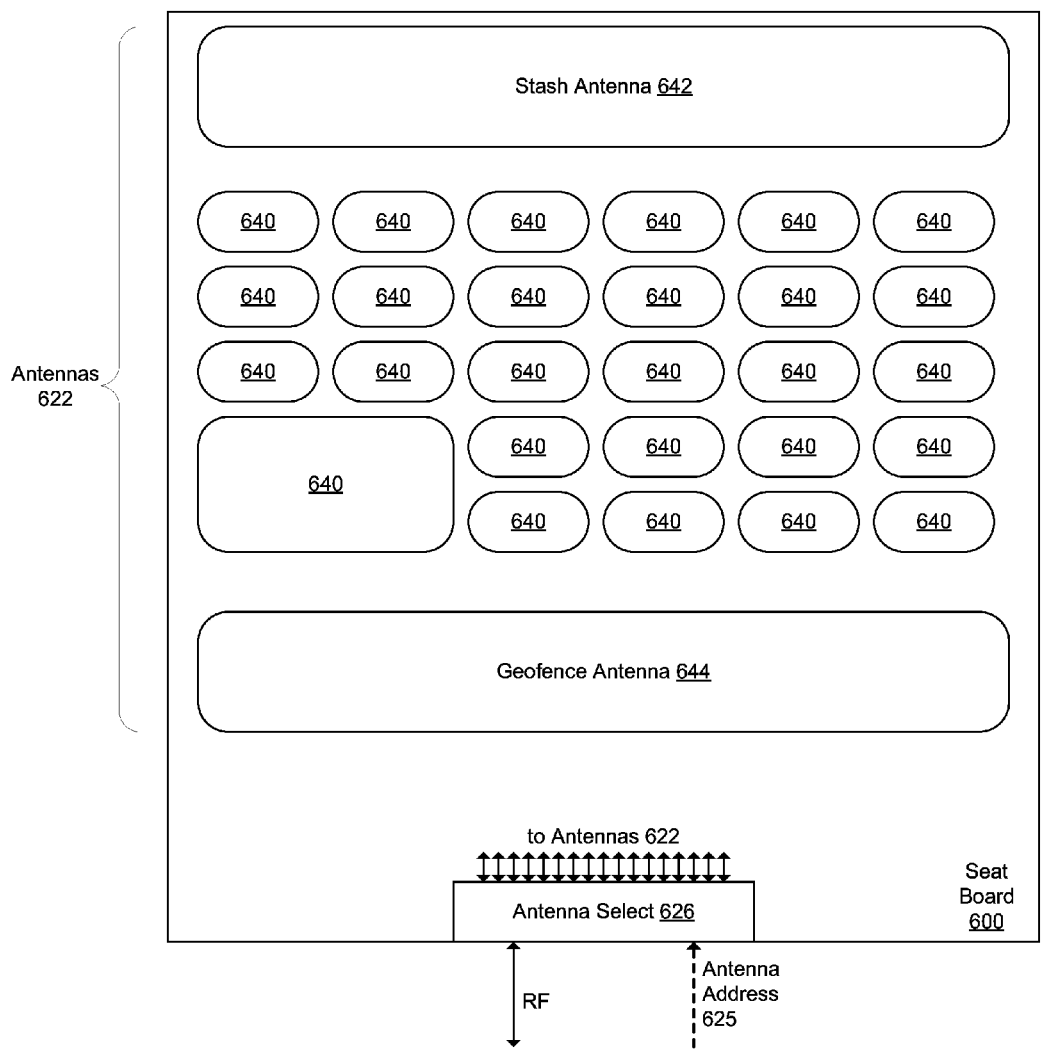
FIG. 6 is a block diagram of a seat board 600.

FIG. 6 is a block diagram of a seat board 600. The seat board 600 may be similar to the seat board 102 (see FIG. 1), the seat board 302 (see FIG. 3), etc. The seat board 600 may be one of a number of seat boards (e.g., one of the seat boards 402 of FIG. 4) on a gaming table (e.g., 420 in FIG. 4), as part of a gaming system (e.g., the system 400 of FIG. 4, 500 of FIG. 5, etc.). The seat board 600 includes antennas 622 and an antenna selection circuit 626 (similar to the antenna selection circuit 126 of FIG. 1, 326 of FIG. 3, etc.). The antenna selection circuit 626 receives the antenna address information 625 (e.g., from a control board such as 104 in FIG. 1 or a computer such as 310 in FIG. 3), and routes radio frequency (RF) energy (e.g., from a network analyzer such as 106 in FIG. 1 or an RFID reader such as 108 in FIG. 1) to and from the selected antenna 622. (To avoid cluttering the figure, the connections from the antenna selection circuit 626 to each of the antennas 622 are not shown.) The antennas 622 include spot antennas 640, a stash antenna 642, and a geofence antenna 644. The seat board 600 may be oriented on the gaming table such that the stash antenna 642 is close to a player (or other customer) and the geofence antenna 644 is close to a dealer (or other employee).

The spot antennas 640 generally correspond to betting spots, so the number, size and placement of the spot antennas 640 may be adjusted as desired to conform to the betting spots. In addition, some of the spot antennas 640 may have no corresponding betting spots, in which case the system need not energize them. The operation of the spot antennas 640 generally corresponds to the operation of the antennas described above (e.g., the antennas 122 of FIG. 1, 322 of FIG. 3, etc.). An embodiment has 36 circular spot antennas, approximately 1 inch in diameter, in a 6×6 array.

The stash antenna 642 generally corresponds to a stash area in which a player places gaming tokens that are not currently in play. Reading the identifiers of gaming objects placed in the stash area allows the system to determine which gaming objects are associated with that player and to track the player as he or she moves from table to table. For this player tracking function, it is only necessary for the system to read a subset of the chips in the stash area. For example, as a player sits at a first table, the system reads all of the player's chips in the stash area of the first table. When the player moves to a second table, the system just needs to read one chip in the stash area of the second table to identify it as one of the group of chips that was previously associated with the player at the first table.

The system may coordinate reading of the spot antennas 640 and the stash antenna 642 according to the game state information. For example, during the gameplay states (e.g., the bets allowed state, etc.) the system reads the spot antennas 640 but not the stash antenna 642, since the important information is the gaming objects being placed and moved around on the spot antennas 640. But between games, the system reads the stash antenna 642 but not the spot antennas 640, since the movement of gaming objects around the spot antennas 640 is not important between games.

The geofence antenna 644 generally corresponds to an area in which the dealer may move a gaming object in order to change a game state. The gaming object may be a wristband, in which case the geofence antenna 644 may be used to detect the movement of the dealer's hand. The wristband includes a resonant circuit, such as a inductor-capacitor (LC) circuit or an RFID tag. If the wristband has the LC circuit and not the RFID tag, the geofence antenna 644 need not be connected to an RFID reader. An example of how the geofence antenna 644 may be used for blackjack is as follows. Each player at the blackjack table has a corresponding seat board 600 with a corresponding geofence antenna 644. When the dealer deals a card to the player, the dealer's wristband crosses over the corresponding geofence antenna 644. Thus, the system detects that the card was dealt to that particular player according to the change in reflectance of the geofence antenna 644.

The system may coordinate reading the geofence antenna 644 according to the game state information. For example, during the "winning bets removed" state, the procedure is for the player to move their winning chips from the betting spots to the stash. If the dealer incorrectly moves the wristband across the geofence antenna 644 to pick up the winning chips, the system is able to generate an alert resulting from detecting the changed reflectance of the geofence antenna 644. As another example, during the "losing bets removed" state, the procedure is for the dealer to remove the losing chips from the betting spots. The system is able to generate an alert if the system does not detect (within a defined time period) the dealer's wristband moving over the geofence antenna 644 to pick up the losing chips.

Since the network analyzer function is faster than the RFID function, the spot antennas 640 may be read faster than if they were read using only the RFID function. For example, assume that the RFID reader takes 5 milliseconds to perform a read of one of the 27 spot antennas 640, and that the gaming objects are within one of the spot antennas 640 (e.g., one stack of gaming objects). Thus, using the RFID reader alone to read the gaming objects and to determine their location within the spot antennas 640 takes 135 milliseconds, since it needs to read all 27 of the antennas 640. Further assume that the network analyzer takes 0.35 milliseconds to obtain the reflection coefficients of one of the spot antennas 640. Thus, using both the network analyzer and the RFID reader to read the gaming objects and to determine their location within the spot antennas 640 takes 14.45 milliseconds: 9.45 milliseconds to obtain the reflection coefficients of 27 of the spot antennas 640, and 5 milliseconds to read the particular antenna 640. Similarly, if the gaming objects are located within two of the spot antennas 640 (e.g., two stacks of gaming objects), using both the network analyzer and the RFID reader to read the gaming objects and to determine their locations takes 19.45 milliseconds.

As another example, assume instead 36 spot antennas 640 in addition to the stash antenna 642 and the geofence antenna 644, and assume that the RFID reader takes 5 milliseconds to perform a read of one of the antennas 622. Thus, using the RFID reader alone to read the gaming objects and to determine their location on the antenna array takes 190 milliseconds, since it needs to read all 38 of the antennas 622. Further assume that the network analyzer takes 0.35 milliseconds to obtain the reflection coefficients of one of the antennas 622. Thus, it takes 13.3 milliseconds to for the network analyzer to scan all 38 antennas. The RFID reader is then directed to read the antennas that have been found to have gaming objects on them by the network analyzer. If 10 antennas have a chip on them it will take the RFID reader 50 milliseconds to read those tags.

Figure 7:
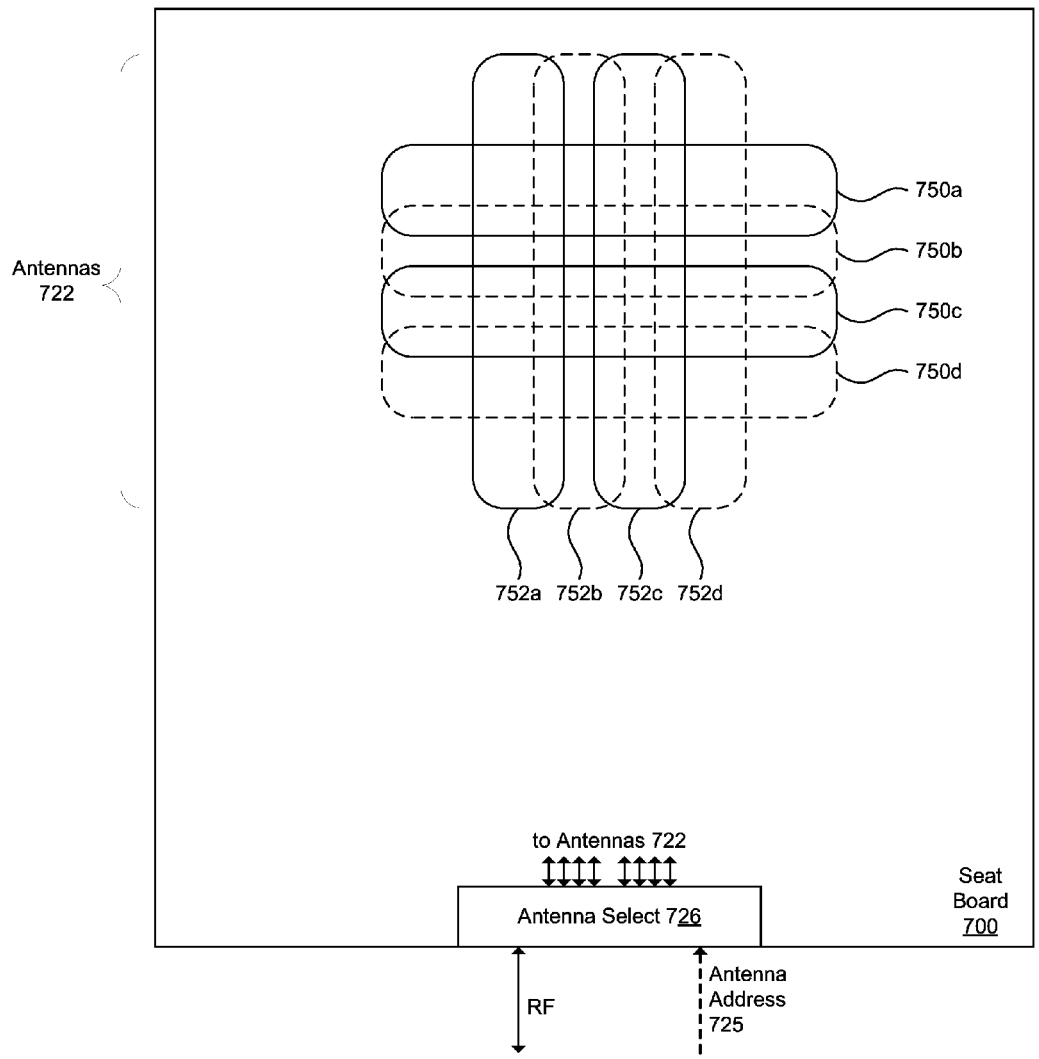
FIG. 7 is a block diagram of a seat board 700.

FIG. 7 is a block diagram of a seat board 700. The seat board 700 may be similar to the seat board 600 (see FIG. 6) and may be one of a number of seat boards (not shown) on a gaming table (not shown), as part of a gaming system (e.g., the system 100 of FIG. 1, 300 of FIG. 3, etc.). The seat board 700 includes antennas 722 and an antenna selection circuit 726 (similar to the antenna selection circuit 626 of FIG. 6). (To avoid cluttering the figure, the connections from the antenna selection circuit 726 to each of the antennas 722 are not shown.) The antennas 722 include horizontal antennas 750a-750d (collectively 750) and vertical antennas 752a-752d (collectively 752). (Note that the terms horizontal and vertical are used in order to be descriptive of what is shown in FIG. 7, but it is to be understood that both sets of antennas are generally planar with respect to the gaming table.) The seat board 700 may also include a stash antenna (not shown), a geofencing antenna (not shown), or other antennas (not shown).

The horizontal antennas 750 overlap each other, and the vertical antennas 752 overlap each other. The antennas that are overlapped are shown with dotted lines. The horizontal antennas 750 intersect with the vertical antennas 752. The horizontal antennas 750 and the vertical antennas 752 together may be referred to as overlapping, intersecting antennas, or as an antenna array. The antennas are overlapping to reduce the possibility of dead spots between antennas. The location of a gaming object corresponds to the intersection of one of the horizontal antennas 750 and one of the vertical antennas 752. In general, each intersection area corresponds to a betting spot on the gaming table.

The antenna selection circuit 726 receives the antenna address information 725, and routes radio frequency energy (e.g., from a network analyzer such as 106 in FIG. 1 or an RFID reader such as 108 in FIG. 1) to and from the selected antenna 722. The general process of detecting and locating gaming objects is as follows.

First, the antenna selection circuit 726 routes radio frequency energy from the network analyzer selectively to the antennas oriented in one direction (e.g., the horizontal antennas 750), and selectively to the antennas oriented in the other direction (e.g., the vertical antennas 752). For example, the antenna address information 725 may instruct the antenna selection circuit 726 to cycle 750a, 750c, 750b, 750d, 752a, 752c, 752b, 752d. The network analyzer sends the resulting reflection coefficients to the system. When the system detects a change in the reflection coefficients for one of the horizontal antennas 750 and one of the vertical antennas 752, this indicates a change in the gaming objects located at the intersection of those two antennas.

Second, the antenna selection circuit 726 routes radio frequency energy from the RFID reader selectively to the particular horizontal antenna 750 and the particular vertical antenna 752 that were identified according to the changed reflection coefficients. The RFID reader sends the resulting tag identifiers to the system, and the system associates those tags with the betting spot corresponding to the intersection of the particular horizontal antenna 750 and the particular vertical antenna 752.

In a similar manner, the system may detect changes in the reflection coefficients at multiple intersection areas. For example, the network analyzer detects reflectance changes on the vertical antenna 752a, and on two horizontal antennas 750a and 750d. The system then controls the RFID reader to read those three identified antennas, and associates the two groups of tags read with the two corresponding betting spots.

The antenna groups 750 and 752 may intersect at various angles. For example, FIG. 7 shows a configuration in which the horizontal antennas 750 and the vertical antenna 752 intersect at right angles. As another example, the horizontal antennas 750 and the vertical antenna 752 may intersect at 45 degrees. The antennas 722 may differ in quantity, size and shape. For example, when the area covered by the antenna array includes large betting spots and small betting spots, the antennas 722 under the large spots may be larger than the antennas 722 under the small spots. The antenna array shown in FIG. 7 may otherwise be similar to the overlapping, intersecting antennas disclosed in U.S. Application Pub. No. 2015/0141126, which is incorporated herein by reference.

Figure 8:
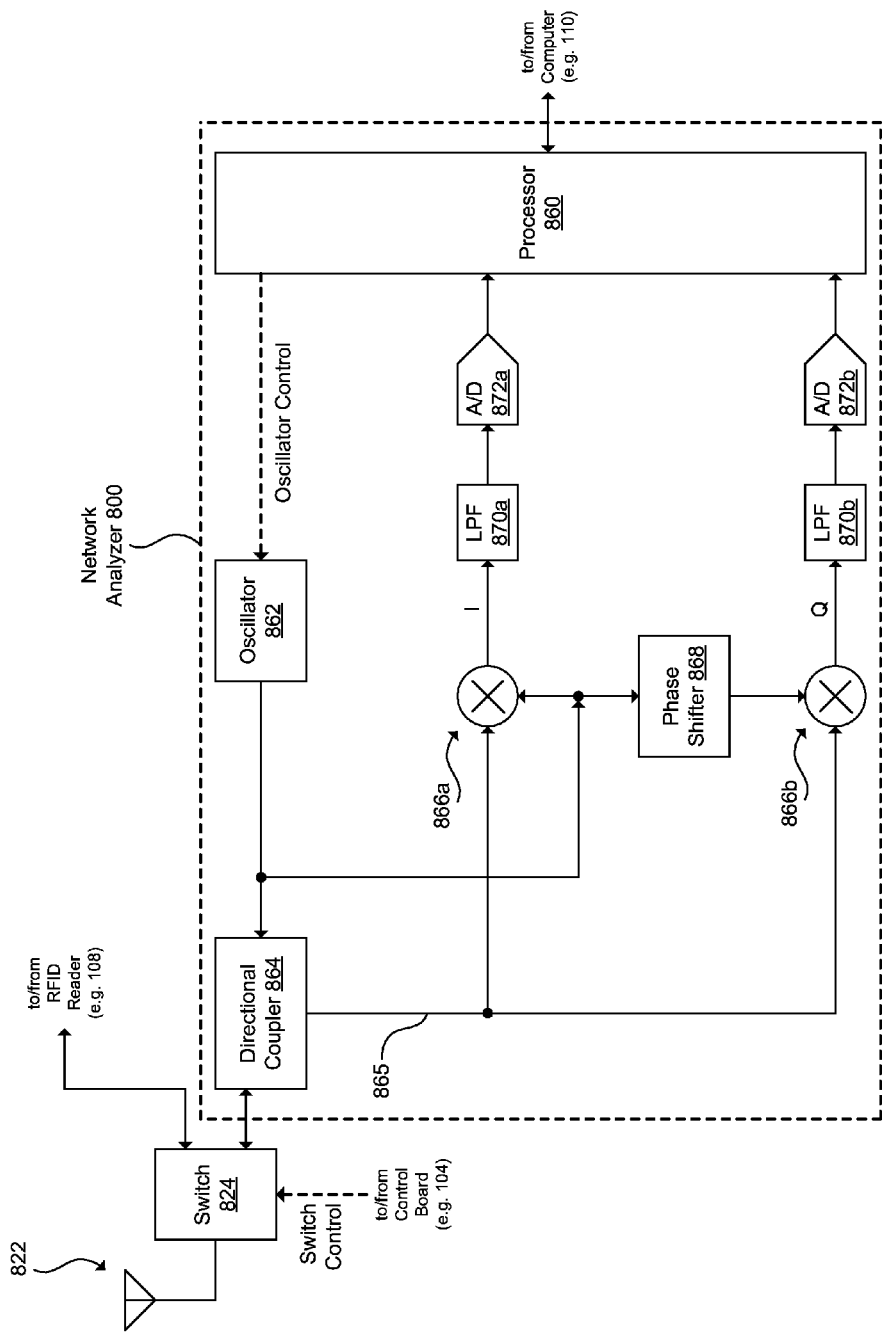
FIG. 8 is a block diagram of a network analyzer 800 and related components.

FIG. 8 is a block diagram of a network analyzer 800 and related components (an antenna 822 and a switch 824). The network analyzer 800 is similar to, and may show more details for, the network analyzer 106 of FIG. 1, 406 of FIG. 4, the network analyzer component of the combined RFID reader and network analyzer 308 of FIG. 3, etc. The antenna 822 is similar to the antennas 122 (see FIG. 1), but omitting some details such as the connections via the antenna selection circuit 126 (see FIG. 1). The switch 824 is similar to the switch 124 (see FIG. 1), selectively connecting one of the network analyzer 800 and an RFID reader (e.g., the RFID reader 108 of FIG. 1) to the antenna 822, as controlled by a signal from a control board (e.g., the control board 104 of FIG. 1). The network analyzer 800 includes a processor 860, an oscillator 862, a directional coupler 864, mixers 866a and 866b, a phase shifter 868, low pass filters (LPF) 870a and 870b, and analog to digital (A/D) converters 872a and 872b. In general, the network analyzer 800 implements an I/Q (in phase and quadrature) receiver.

The processor 860 generally controls the operation of the network analyzer 800. The processor 860 controls the oscillator 862, receives information from the analog to digital converters 872a and 872b, and communicates with a computer (e.g., the computer 110 of FIG. 1, the computer 310 of FIG. 3, etc.). For example, the computer may instruct the network analyzer 800 to measure the reflectance of the antenna at a given frequency.

The oscillator 862 generally generates a radio frequency signal at the frequency instructed by the processor 860. For example, for gaming objects that operate at 13.56 MHz, the oscillator 862 may generally operate between 12 and 14 MHz. As another example, if there is one gaming object near the antenna 822, and the processor 860 instructs the oscillator 862 to step from 13.26 MHz to 13.86 MHz in 0.003 MHz increments (200 frequencies), the resulting reflection coefficients have rho and theta values that correspond to the line 201 in FIG. 2A. The oscillator 862 provides its output to the directional coupler 864 and to the mixers 866a and 866b.

The directional coupler 864 generally couples the output from the oscillator 862 to the antenna 822 and to the mixers 866a and 866b (line 865). The signal 865 coupled back to the mixers 866a and 866b is less in power than that coupled to the antenna 822, e.g. −10 dB. Unless there is a perfect match to the antenna 822, some amount of the signal going to the antenna 822 is reflected back. The directional coupler 864 picks off a fraction of the reflected signal and sends it to the mixers 866a and 866b. The radio frequency signal from the oscillator 862 that is coupled to the antenna 822 has a reflectance that corresponds to the reflection coefficients. As gaming objects couple with and uncouple from the antenna 822, the reflection coefficients at the selected frequency from the oscillator 862 change. The reflectance is then a component of the signal 865 coupled back to the mixers 866a and 866b.

The mixer 866a, the low pass filter 870a, and the analog to digital converter 872a generally implement an in phase (I) path for the signal 865 reflected back from the antenna 822. The mixer 866a receives the signal 865 from the directional coupler 864 and demodulates the signal 865 with the output of the oscillator 862, generating an in phase (I) component of the reflectance. The low pass filter 870a performs low pass filtering on the in phase (I) component, then the analog to digital converter 872a converts the filtered in phase (I) component into a digital signal that is provided to the processor 860.

The phase shifter 868 generally shifts the phase of the output of the oscillator 862 by 90 degrees and provides the phase shifted signal to the mixer 866b.

The mixer 866b, the low pass filter 870b, and the analog to digital converter 872b generally implement a quadrature (Q) path for the signal 865 reflected back from the antenna 822. The mixer 866b receives the signal 865 from the directional coupler 864 and demodulates the signal 865 with the output of the phase shifter 868 (the phase shifted output of the oscillator 862), generating a quadrature (Q) component of the reflectance. The low pass filter 870b performs low pass filtering on the quadrature (Q) component, then the analog to digital converter 872b converts the filtered quadrature (Q) component into a digital signal that is provided to the processor 860.

The processor 860 receives the digital I and Q components from the analog to digital converters 872a and 872b, and provides them to the computer (e.g., the computer 110 of FIG. 1).

Figure 9:
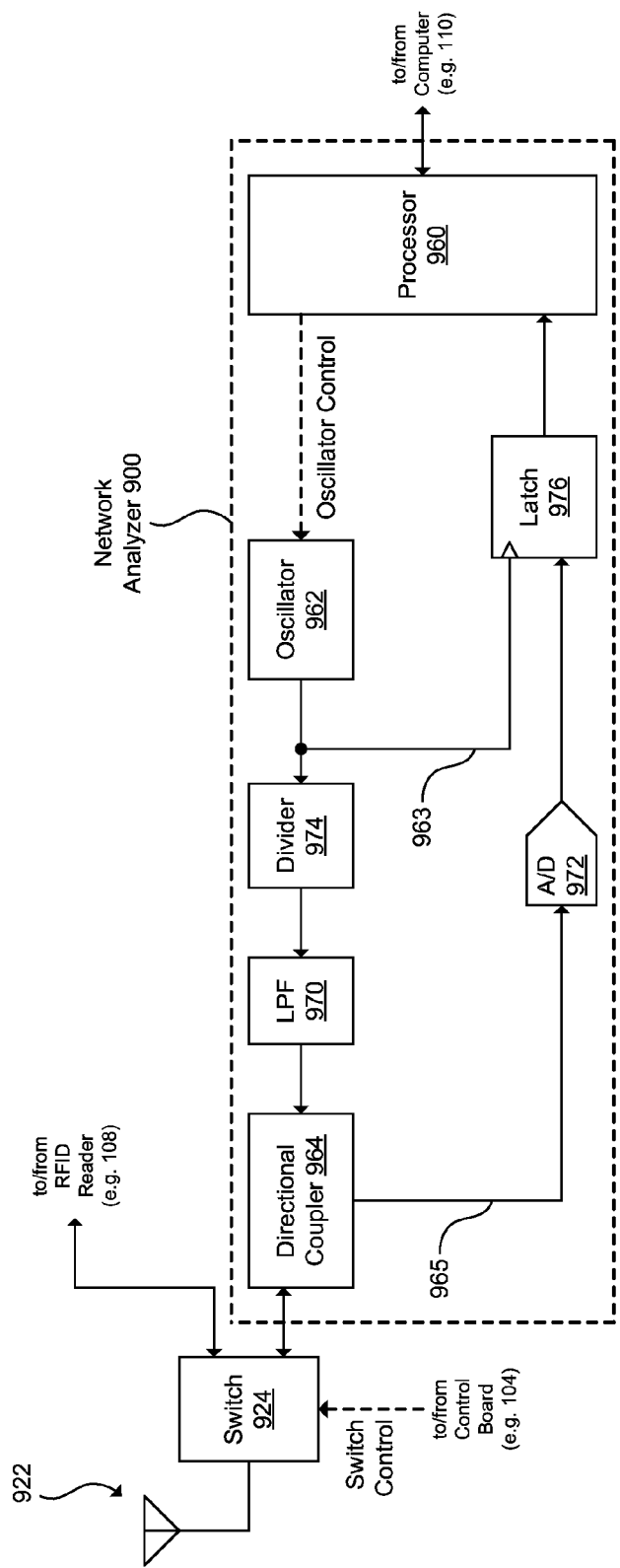
FIG. 9 is a block diagram of a network analyzer 900 and related components.

FIG. 9 is a block diagram of a network analyzer 900 and related components (an antenna 922 and a switch 924). The network analyzer 900 is similar to, and may show more details for, the network analyzer 106 of FIG. 1, 406 of FIG. 4, the network analyzer component of the combined RFID reader and network analyzer 308 of FIG. 3, etc. The antenna 922 is similar to the antennas 122 (see FIG. 1), but omitting some details such as the connections via the antenna selection circuit 126 (see FIG. 1). The switch 924 is similar to the switch 124 (see FIG. 1), selectively connecting one of the network analyzer 900 and an RFID reader (e.g., the RFID reader 108 of FIG. 1) to the antenna 922, as controlled by a signal from a control board (e.g., the control board 104 of FIG. 1). The network analyzer 900 includes a processor 960, an oscillator 962, a divider 974, a low pass filter 970, a directional coupler 964, an analog to digital converter 972, and a latch 976. In general, the network analyzer 900 implements an I/Q (in phase and quadrature) receiver.

The processor 960 generally controls the operation of the network analyzer 900. The processor 960 controls the oscillator 962, receives information from the latch 976, and communicates with a computer (e.g., the computer 110 of FIG. 1, the computer 310 of FIG. 3, etc.). For example, the computer may instruct the network analyzer 900 to measure the reflectance of the antenna at a given frequency.

The oscillator 962 generally generates a radio frequency signal at the frequency instructed by the processor 960. The oscillator 962 operates in combination with the divider 974 to generate frequencies that are appropriate for the gaming objects. For example, for gaming objects that operate at 13.56 MHz, the divider 974 divides by four and the oscillator 962 may generally operate between 48 and 56 MHz (so that the resulting range is 12 to 14 MHz). As another example, if there is one gaming object near the antenna 922, and the processor 960 instructs the oscillator 962 to step from 53.04 MHz to 55.44 MHz in 0.012 MHz increments (200 frequencies), the resulting reflection coefficients have rho and theta values that correspond to the line 201 in FIG. 2A. The oscillator 962 provides its output to the divider 974 and to the latch 976 (as the clock signal 963).

The divider 974 generally divides the output from the oscillator 962 by four to return the frequency to the desired operational range for the gaming objects (e.g., from 53.04-55.44 MHz to 13.26-13.86 MHz). The divider 974 provides the divided frequency signal to the low pass filter 970.

The low pass filter 970 generally performs low pass filtering on the divided frequency signal to eliminate any harmonics. The low pass filter 970 provides the filtered signal to the directional coupler 964.

The directional coupler 964 generally couples the filtered signal from the low pass filter 970 to the antenna 922 and to the analog to digital converter 972 (line 965). The signal 965 coupled back to the analog to digital converter 972 is less in power than that coupled to the antenna 922, e.g. −10 dB. Unless there is a perfect match to the antenna 922, some amount of the signal going to the antenna 922 is reflected back. The directional coupler 964 picks off a fraction of the reflected signal and sends it to the analog to digital converter 972. The radio frequency signal from the oscillator 962 and the divider 974 that is coupled to the antenna 922 has a reflectance that corresponds to the reflection coefficients. As gaming objects couple with and uncouple from the antenna 922, the reflection coefficients at the selected frequency from the oscillator 962 change. The reflectance is then a component of the signal 965 coupled back to the analog to digital converter 972.

The latch 976, since it is clocked by the undivided output 963 from the oscillator 962, operates at four times the frequency of the signal coupled to the antenna 922 (and reflected back as the signal 965). The clock signal 963 operates as a 4× sampling clock that is synchronous with the signal sent to the antenna 922. This enables the latch 976 to detect the I and Q channels of the signal 965 by sampling the signal 965 at four times the frequency. The latch 976 sends the I and Q channels to the processor 960.

The processor 960 combines the I and Q channel data from the latch 976 to determine the I and Q components of the reflected signal 965, and provides them to the computer (e.g., the computer 110 of FIG. 1). The processor may determine the I and Q components as follows. If the frequency we wish to measure is 13 MHz, then the sampling rate is 52 MHz on the analog to digital converter 972. For example, if the samples are sequentially numbered 1, 2, 3, 4, 5, 6, 7, 8, 9, 10, 11, 12, . . . , then the I value is obtained by the sum of sample 1−sample 3+sample 5−sample 7+sample 9−sample 11, etc. This sum is then divided by the number of samples to normalize it. The Q value is the sum of sample 2−sample 4+sample 6−sample 8+sample 10−sample 12, etc. Again divided by the number of samples to normalize it. The processor 960 may be a component of a field programmable gate array (FPGA) circuit that performs the combination.

Figure 10:
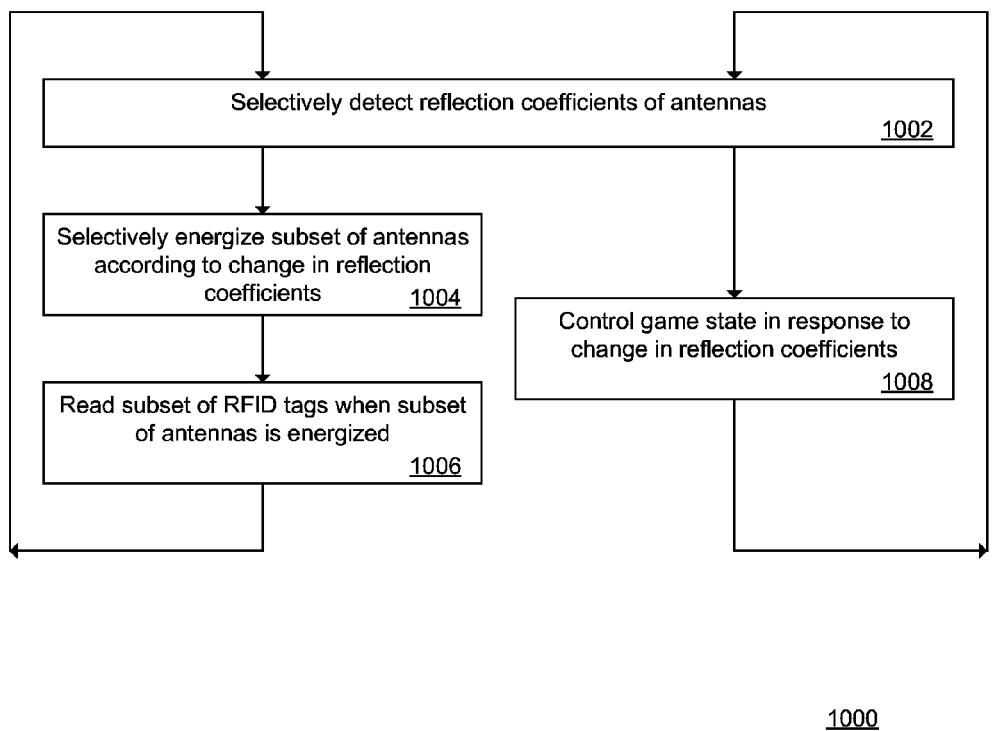
FIG. 10 is a flowchart of a method 1000 of detecting events in a gaming environment.

FIG. 10 is a flowchart of a method 1000 of detecting events in a gaming environment. The method 1000 may be performed by the system 100 (see FIG. 1), 300 (see FIG. 3), etc. For example, the computer 110 (see FIG. 1) may execute a computer program that controls the components of the system 100 to perform the method 1000.

At 1002, a plurality of reflection coefficients that are associated with a plurality of antennas positioned on a gaming table are selectively detected. For example, the network analyzer 106 (see FIG. 1) may selectively detect the reflection coefficients associated with the antennas 122 on the gaming table 120, as controlled by the computer 110 and the control board 104. The reflection coefficients change as a plurality of RFID tags interact with the plurality of antennas. For example, gaming objects that include the RFID tags may couple with or decouple from the antennas 122, which change the reflection coefficients.

At 1004, a subset of the plurality of antennas are selectively energized according to the change in the plurality of reflection coefficients. For example, the RFID reader 108 (see FIG. 1) may selectively energize the subset of antennas that have the changed reflection coefficients (see 1002).

At 1006, a subset of the plurality of RFID tags is read when the subset of the plurality of antennas is energized. For example, the RFID reader 108 (see FIG. 1) may read the RFID tags in the gaming objects that are associated with the subset of antennas that have the changed reflection coefficients (see 1002). The flow may then return to 1002.

At 1008, a game state related to the gaming table in the gaming environment is controlled in response to the change in the plurality of reflection coefficients. For example, when the dealer moves a gaming object across the geofence antenna 644 (see FIG. 6), the computer 110 (see FIG. 1) changes a game state related to the gaming table 120. The flow may then return to 1002.

As can be seen from the flow, detecting the reflection coefficients (see 1002) can be used for two purposes: to determine which antennas to energize for a read operation (see 1004 and 1006), or to control the game state (see 1008).

The following sections provide more details regarding the systems and methods described above.

Additional Details

As mentioned above, embodiments are directed to improving the speed of detecting gaming objects in a gaming environment. Example gaming objects include betting tokens (or gaming chips), gaming cards, and a dealer's wristband (or other object associated with the hand or wrist of a dealer or other employee).

Regarding betting tokens, the system is able to accurately locate gaming chips on the gaming table using RFID antennas (e.g., the antennas 122 of FIG. 1). The system is able to reduce the time involved in scanning and reading all the antennas by first detecting changes in reflection coefficients with a network analyzer (e.g., the network analyzer 106 of FIG. 1), then by only reading those antennas associated with the changed reflection coefficients.

Regarding gaming cards, identifying and tracking the distribution of cards in real-time on a gaming table can augment the information from tracking betting tokens. Identifying the suit and face value of each card and knowing where each card was dealt can define winners and losers. In some games (e.g. Blackjack), the distribution of cards is unpredictable (a player can choose to "hit" or not) and the system is able to determine where the card went in order to determine winners and losers. The system detects the placement of a card by identifying the nearest antenna, and determines the suit and value of the card by reading an RFID tag in the card.

Regarding a dealer's wristband, the system detects changes in the reflection coefficients of a geofence antenna (e.g., the geofence antenna 644 of FIG. 6) when the dealer moves his or her hand (with the wristband or other gaming object) over the geofence antenna. Each game on a gaming table has rules that track proper behavior on the part of dealers and players. But the appropriate set of rules evolves through different phases of a game. For example, there is a point at which players are no longer allowed to change their bets (typically prior to dealing the cards), and another point at which the game outcome is known (typically when a dealer turns his cards face up). One can think of each of these as defining a change in the "game state". The system is able to detect when the dealer deals the cards, by detecting the dealer's wristband coupling with the geofence antenna as the dealer moves his hand to deal the card to the player. The system is able to detect when the game is over, by detecting the dealer's wristband coupling with the geofence antenna as the dealer moves his hand. For example, once the outcome of the game is known (e.g., the dealer has shown his hand), the procedure is to resolve winning and losing bets seat by seat (e.g., clockwise). The system reads the geofence antenna to detect the presence of the wristband when a particular seat is being resolved. When the last seat has been resolved, the system transitions to the next game state (e.g., game over state, new game state, etc.).

The system may implement a game rule database (e.g. using the databases 130 of FIG. 1) that the system applies as the system detects the game moving from one game state to another. For example, a "bet" refers to a group of RFID tags that are read in a betting spot. The game rules define actions that are allowed, or disallowed, for the bet according to the game state. One example is detecting a change in location of the bet: Bets are not allowed to be moved from one betting spot to another in some game states (e.g., after the "bets locked" event). Another example is detecting a change in value of the bet: Additional RFID tags are not allowed to be added to or removed from the bet in some game states (e.g., after the "bets locked" event). Another example is detecting a late placement of the bet: Additional bets are not allowed to be made in some game states (e.g., after the "bets locked" event). Another example is detecting an improper removal of the bet in a losing situation: The system generates an alert if it fails to detect the dealer wristband moving over the geofence antenna to collect the losing bet within a defined time period during the "remove losing bets" game state. Another example is detecting an improper payout to the bet in a winning situation: The system reads the RFID tags in the betting spot after the dealer has paid out the winning bet, and generates an alert if the payout amount is incorrect. Detecting the game state, generating alerts, etc. may otherwise be as described in U.S. Application Pub. No 2015/0312517, which is incorporated herein by reference.

Network Analyzer Details

Traditionally, a network analyzer is used to measure and optimize the impedance matching of a RFID reader, an antenna, and one or more RFID tags. In contrast, embodiments described herein measure and exploit changes in the reflection coefficient to regularly check on the presence (or absence) of objects entering (or leaving) the excitation field of the RFID reader. The systems described herein integrate network analyzer functionality (the ability to measure reflection coefficient) with the RFID reader, and detect any de-tuning of the reader antenna's resonant circuit. The resulting shift in reflection coefficient is greater when the object in the field is resonant within the frequency response of the excitation antenna. Thus the reflection coefficient can be a sensitive and selective detector of proximal resonant circuits.

One feature enabled by using the network analyzer is to increase the read speed of the gaming table. Since reading of tags can be time consuming (e.g., it can take 20 milliseconds to identify each tag), there is value in being able to know—a priori of taking a reading—whether or not there is a tag in the field. This issue is exacerbated when one needs to read a large number of antennas quickly. Even more of a problem is when the system is using these antennas to help define the location of one or more tags and there is "crosstalk" between neighboring antennas. In addition, there is an associated overhead even when no tags are in the field (e.g., it can takes 10 milliseconds to determine there are no tags in the vicinity). Knowing which antennas actually have tokens on them and which do not can greatly speed up the time it takes for the RFID reader to identify the tags and determine their proper location.

The system uses a circuit to determine the antenna reflection coefficient over a range of one or more frequencies to determine if these reflection coefficients are different from an established baseline. This measurement (using the network analyzer) can be done across a number of antennas at a rate that is significantly faster than it takes to energize and read an RFID tag (using the RFID reader). The results of this measurement can then be used to direct the RFID scan to specific antennas. In one embodiment, it takes 300 microseconds to scan a single antenna at three different frequencies. In one embodiment, the three frequencies are 12.8, 13.2, and 13.6 MHz.

Another feature enabled by using the network analyzer is geofencing. The integration of a network analyzer with the system can be used to create a geofence (see FIG. 6) to determine the presence of any properly tuned circuit very quickly. This allows the detection of highly transitory events. The network analyzer has a very fast measurement cycle—much faster than that of an RFID reader alone. In one embodiment, the system detects tuned circuits built into laminated cards. The same tuned circuit can used for all cards (e.g., the cards do not each have a distinct identifier). An instrumented shoe may be used to determine the face value of each card and the geofence antenna may be used to determine where that card was dealt. Knowing which cards were dealt and to whom they were dealt is valuable information. In another embodiment, tuned circuits are built into wristbands worn by the dealer. The geofence antenna is used to detect when the dealer's hands have crossed over to manipulate tokens (e.g. collect losing bets or payout winning bets). This information can be valuable when defining automated rules for proper game play.

Determining Reference Reflectances

The reference (also referred to as baseline) reflectances for each antenna may be initially determined when the gaming table (e.g., 120 in FIG. 1, etc.) is installed. The system may store the baseline reflectance information in a database (e.g., the reflection coefficients database in the databases 130 of FIG. 1), in a memory of the control board (e.g., 104 in FIG. 1), etc. The process for obtaining the baseline reflectances is as follows. First (1), the system uses the RFID reader (e.g., 108 in FIG. 1) to read an antenna, in order to determine that no gaming objects are coupled to the antenna. Second (2), the system uses the network analyzer (e.g., 106 in FIG. 1) to obtain the reflection coefficient at a first frequency. Third (3), the system uses the RFID reader (e.g., 108 in FIG. 1) to read the antenna again; if the RFID reader detects gaming objects, then the reflection coefficient is discarded. Fourth (4), the system performs the steps (1)-(3) again five more times, to result in six measurements for the baseline reflection coefficients. Fifth (5), the system averages those six measurements to use as the baseline reflection coefficient for the first frequency. Sixth (6), the system performs the steps (1)-(5) for a second frequency. Seventh (7), the system performs the steps (1)-(5) for a third frequency. Eighth (8), the system stores this set of three reflection coefficients as the baseline for that antenna, and the system moves on to determine the baseline for another antenna.

A similar process may be used once the system has been installed. The reflectance of an antenna may change over time, for example due to temperature, humidity, etc. The system may perform this process in the background so that it does not degrade the performance of the system. For example, for a seat board with 36 antennas, one antenna is sequentially selected as the network analyzer is scanning the seat board; if no RFID tags are present to interrupt the cycle, the baseline values may all be updated after (36*6) 216 network analyzer scans. The update process is similar to that described above. The system performs the steps (1)-(4) as above. In place of the fifth (5) step, the system discards the two measurements that are furthest away from the current baseline, and averages the remaining four measurements. Finally, the system performs the remainder of the steps (6)-(8) as above.

Matching Reflection Coefficients

As discussed above, the system (e.g., 100 in FIG. 1) need not measure or store a large number of reflection coefficients over a particular frequency range. Instead, the system may store a small set of reflection coefficients corresponding to a small number of reflectance measurements in the particular frequency range. In one embodiment, the network analyzer (e.g., 106 in FIG. 1) measures the reflectance of a selected antenna at three frequencies: 13.2, 13.3 and 13.4 MHz. Each frequency has corresponding rho and theta values, so the measurement for a particular antenna results in six values.

The system then compares the measured six values with a stored set of six values (e.g., a baseline set corresponding to zero gaming objects, a previous set corresponding to the previous measurement for that antenna, etc.).

The threshold for determining if the difference between two detected sets of reflection coefficients is significant enough to be classified as a "change" may be set as follows. First, the reflectance for the antenna at a particular frequency for zero gaming objects is measured over one minute; the maximum of this measurement is the noise distance. Second, one gaming object is placed within the betting spot for the antenna and the reflectance is measured; this provides the single chip distance. Third, the threshold may be set at a distance that is halfway between the maximum noise distance and the single chip distance.

Other frequencies, and other numbers of frequencies, may be used as desired according to the specifics of the implementation. These specifics include the particular resonant frequency of the gaming objects, the particular antenna size, the particular antenna shape, the particular antenna reflectance, etc. For example, one frequency (with one set of values) may be used, two frequencies (with two sets of values) may be used, four frequencies (with four sets of values) may be used, five frequencies (with five sets of values) may be used, etc. As another example, the frequencies of 13.2, 13.3 and 13.4 MHz may be adjusted upward or downward by between 0 and 0.05 MHz.

Antenna Cycling Options

As discussed above, the system (e.g., 100 in FIG. 1) first uses the network analyzer (e.g., 106 in FIG. 1) to determine which of the antennas (e.g., 122 in FIG. 1) have a change in gaming objects associated therewith, then the system uses the RFID reader (e.g., 108 in FIG. 1) to read only those antennas with the change. There are a number of ways the system can sequence the operation of the network analyzer and the RFID reader, depending upon the number of antennas, the number of network analyzers, and the number of RFID readers.

Consider the system 100 of FIG. 1. One option is that the system 100 may use the network analyzer 106 to cycle through all of the antennas 122, then the system 100 may use the RFID reader 108 to read only those antennas 122 having the changed reflection coefficient. Another option is that the system 100 may use the network analyzer 106 to cycle through the antennas 122; if a changed reflection coefficient is detected, the system 100 stops the network analyzer 106 at its current spot in the cycle and controls the RFID reader 108 to read that particular antenna 122 having the changed reflection coefficient; after the particular antenna 122 has been read, the system 100 controls the network analyzer 106 to continue on from its current spot in the cycle.

Consider the system 400 of FIG. 4. One option is that the system 400 may control the network analyzers 406 and the RFID readers independently. For example, the system 400 may instruct each of the network analyzers 406 independently to cycle through all of the antennas 422 on its corresponding seat board 402, then the system 400 may independently use only those RFID readers 408 associated with the seat boards 402 having the changed reflection coefficients to read the corresponding antennas 422 having the changed reflection coefficients. The network analyzers 406 and the RFID readers 408 may be controlled independently in that when one network analyzer (e.g., 406a) is measuring the reflection coefficients on its associated seat board (e.g., 402a), the RFID reader (e.g., 408b) associated with another seat board (e.g., 402b) may be performing RFID read operations.

As a variation for the system 400 of FIG. 4, the system 400 may instruct a particular network analyzer 406 to stop cycling through the antennas 422 on its corresponding seat board 402 when the system 400 detects a changed reflectance for a particular antenna 422. The system 400 then controls the corresponding RFID reader 408 to read that particular antenna 422. Once the corresponding RFID reader 408 has obtained the RFID tag identifiers, the system 400 instructs the particular network analyzer 406 to continue its scan.

Consider the seat board 600 of FIG. 6. One option is that the system (e.g., 100 in FIG. 1) instructs the network analyzer (e.g., 106 in FIG. 1) to scan the stash antenna 642 and the geofence antenna 644 each time the network analyzer scans one of the antennas 640 as it cycles through the antennas 640. If the system detects a change in the reflectance of the geofence antenna 644, the system uses that information to adjust the game state as discussed above. If the system detects a change in the reflectance of the stash antenna 642 or one of the antennas 640, the system controls the RFID reader (e.g., 108 in FIG. 1) to read the antenna with the changed reflectance. As another option, the system cycles through all of the antennas 622 with the network analyzer; then when the cycle is complete, the system uses the RFID reader to perform a read of those antennas having changed reflectances.

Geofence Features

As discussed above, the geofence antenna (e.g., 644 in FIG. 6) may be connected to the network analyzer (e.g., 106 in FIG. 1) but not the RFID reader (e.g., 108 in FIG. 1). In such an implementation, the gaming objects that interact with the geofence antenna need not include an RFID tag, but may only include another object that couples to the geofence antenna and changes the reflection coefficients. The coupling may occur as the gaming object crosses over the geofence antenna, lands within or on top of the geofence antenna, etc. This other object may be a metalized layer in a gaming card, a resonant circuit (e.g., an LC circuit) in a dealer wristband, etc.

Regarding gaming cards, one way for the system to determine the value (e.g., rank and suit) of a gaming card is to use an instrumented gaming shoe that reads a gaming card as the dealer removes it from the instrumented shoe, or to use a camera that captures an image of the gaming card for the system to identify using pattern recognition. In combination with the geofence antenna, the system may then determine to which player seat a particular gaming card is dealt, by monitoring the geofence antennas of the seat boards (e.g., the seat boards 402 of FIG. 4).

As with gaming objects described above that include RFID tags or resonant circuits, the system is also able to detect reflectance changes of the geofence antenna of gaming objects that include a metalized layer. The metalized layer may be a layer of metal foil, such as aluminum foil. The metalized layer may have a number of advantages over a resonant circuit, yet the system is still able to detect changes in reflectance of the geofence antenna due to coupling by the metalized layer. These advantages may include being less expensive than a resonant circuit, being thinner than a resonant circuit, being structurally more flexible than a resonant circuit, or having less weight than a resonant circuit.

Figure 11:
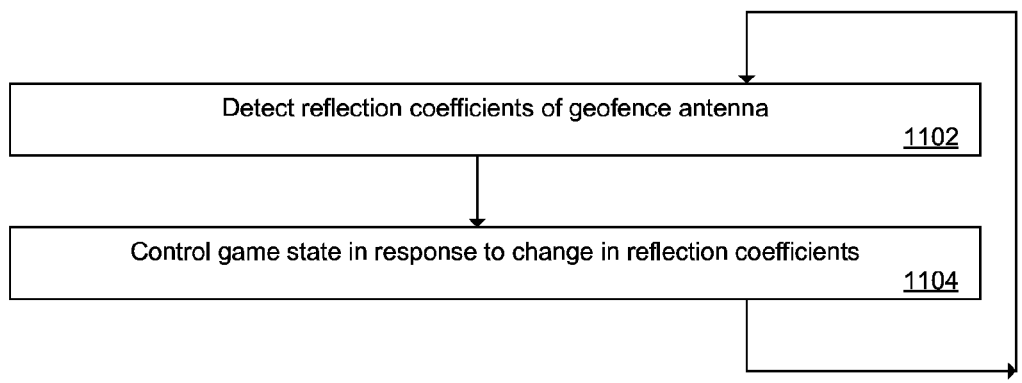
FIG. 11 is a flowchart of a method 1100 of detecting events in a gaming environment.

FIG. 11 is a flowchart of a method 1100 of detecting events in a gaming environment. The method 1100 may be performed by the system 100 (see FIG. 1), 300 (see FIG. 3), etc. For example, the computer 110 (see FIG. 1) may execute a computer program that controls the components of the system 100 to perform the method 1100.

At 1102, a plurality of reflection coefficients that are associated with an antenna positioned on a gaming table are detected. For example, the network analyzer 106 (see FIG. 1) may detect the reflection coefficients associated with one of the antennas 122 (e.g., a geofence antenna). The reflection coefficients change as an object interacts with the antenna. For example, a gaming object that includes a metalized layer or a resonant circuit may couple with or decouple from the geofence antenna, which changes the reflection coefficients.

At 1104, a game state related to the gaming table in the gaming environment is controlled in response to the change in the plurality of reflection coefficients. For example, when the dealer moves a gaming object across the geofence antenna 644 (see FIG. 6), the computer 110 (see FIG. 1) changes a game state related to the gaming table 120. The flow may then return to 1102.

The system (e.g., 100 of FIG. 1) may implement both the method 1100 of FIG. 11 as well as the method 1000 of FIG. 10. For example, the system may implement the method 1000 with the spot antennas 640 (see FIG. 6), and may implement the method 1100 on the geofence antenna 644 (see FIG. 6).

Speed and Power Summaries

In general, the network analyzer (e.g., 106 in FIG. 1) takes between 0.1 and 0.3 milliseconds to scan one of the antennas (e.g., 122 in FIG. 1), and the RFID reader (e.g., 108 in FIG. 1) takes between 5 and 500 milliseconds to read the RFID tags at that antenna. The large variation in time for the RFID reader is due to response collisions by the RFID tags, so reading 1 tag takes 5 milliseconds and reading 60 tags takes 500 milliseconds. Thus, using the network analyzer allows for significant improvement in overall system read time, since the RFID reader need not spend the 5 milliseconds to determine there are no RFID tags present at a particular antenna.

In general, the network analyzer uses between 0.8 and 1 milliwatts to scan one of the antennas, and the RFID reader uses between 1000 and 2000 milliwatts to read the RFID tags at that antenna. Thus, using the network analyzer allows for significant improvement in overall system power usage, since the RFID reader need not spend the power to read antennas that have no tags.

Detecting a Human Hand

The following sections describe implementations that use a network analyzer to detect the movements of a human hand. The details are otherwise similar to those described above.

One of the important parameters when designing an RF system is the antenna match. Specifically, maximum radiated power is achieved when the antenna is matched to the driving impedance. Thus, great effort is expended to insure a good impedance match between the driver and the antenna. A perfect match results in no reflected power from the port of the antenna back to the driving circuitry. Thus, it is common in the industry to use reflected power as a gauge of how well one has matched the driver to the antenna.

The systems discussed herein exploit this characteristic by monitoring reflected power—in real time—to detect transient perturbations in antenna impedance. Specifically, when an object (such as a hand or other human appendage) is placed in the magnetic field of a driven antenna, the impedance of the antenna is disturbed and a portion of the energy is now reflected back. A directional coupler can then be used to separate the forward power to the antenna from the reflected power from the antenna (see, e.g., the directional coupler 864 in FIG. 8). By setting a baseline reflection coefficient when no appendage is present and comparing it to a transient reflection coefficient above a noise threshold, one can detect hand motions proximal to the antenna. In practice, sensing both the amplitude and the phase of the reflected signal (typically in the form of I and Q—the real and imaginary parts of the reflected signal) allows the system to detect these hand motions.

RFID systems at 13.56 MHz use the magnetic field to couple the antenna to one or more tags in the excitation field. A high magnetic field is achieved by having a high Q antenna (one that is narrowly matched at the operating frequency).

Using the same 13.56 MHz antenna for sensing of the hand as is used for the RFID simplifies the overall system. 13.56 MHz is a frequency that is allowed higher power levels by the Federal Communications Commission (FCC), making it a good choice of frequency for both RFID and sensing of hand motion. The system to detect the appendage can have good filtering, as the appendage moves slowly relative to the speed of the RF system (which is only limited by the antenna bandwidth).

In one embodiment, an antenna with a Q of 100 gives good detection capability. The Q determines the system bandwidth, and a Q of 100 provides a 136 KHz of bandwidth. With this bandwidth it is possible to detect events as quick as 10 microseconds (usec), which is far greater than any motion of a human hand.

The power reflected from the antenna can be represented as I and Q values on a unit circle, where a fully reflected signal would be plotted as a point on the circumference of the circle (the location on the circumference determined by the phase) and a perfectly matched antenna would have 0 reflected power and be represented by a point in the center of the circle. In practice, the antenna match will not be perfect, but will be somewhere near the center.

Embodiments exploit the displacement of I and Q values when a hand (or other device) perturbs the field.

Figure 12:
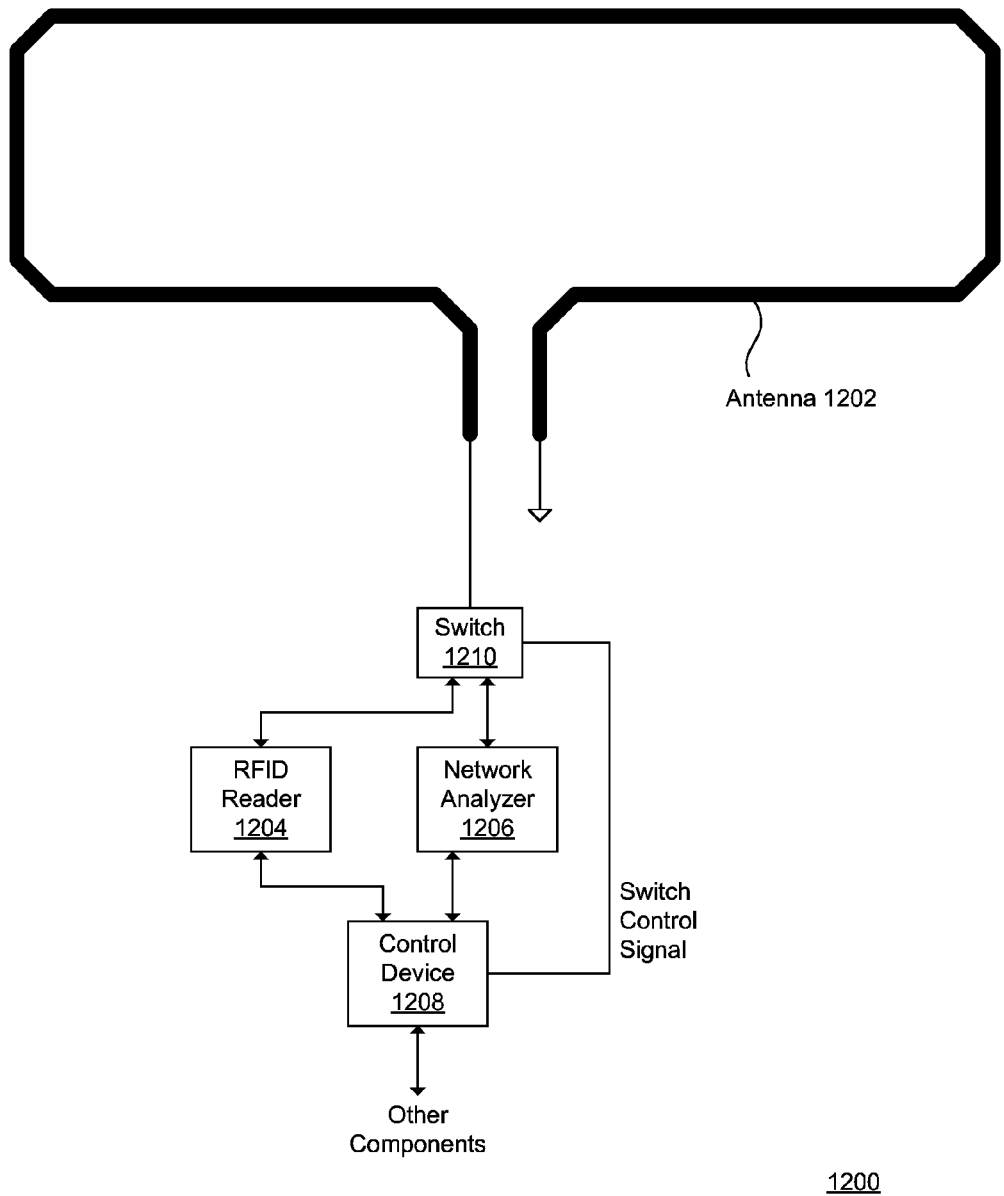
FIG. 12 is a block diagram of a detection system 1200.

FIG. 12 is a block diagram of a detection system 1200. In general, the detection system 1200 is a component of a gaming table. The detection system 1200 is similar to the other systems described herein (e.g., the system 100 of FIG. 1, the seat board 600 of FIG. 6, etc.). However, the detection system 1200 also includes the capability to detect hand (or other appendage) movements, and to use that information to control the game state. The detection system 1200 includes an antenna 1202, an RFID reader 1204, a network analyzer 1206, a control device 1208, and a switch 1210.

The antenna 1202 is a single loop antenna that operates at 13.56 MHz and has a Q of around 100, as discussed above. The antenna 1202 is placed on the gaming table (see, e.g., the gaming table 120 of FIG. 1). The antenna 1202 may be on a seat board (see, e.g., the seat board 402a of FIG. 4). The antenna 1202 may be one of a number of similar antennas on the gaming table. In general, the antenna 1202 is related to a betting spot, or other type of game action area, in which RFID tags or hand motions are to be detected. The placement of the antenna 1202 on the gaming table may be adjusted as desired. The antenna 1202 may be a printed circuit board antenna with a length of 9 inches and a width of 2 inches. These dimensions may be adjusted as desired to increase or decrease the area to be monitored. For example, the antenna 1202 may be trapezoidal in shape, or otherwise shaped to fit within defined areas of the gaming table. The antenna 1202 has one end connected to the switch 1210 and another end connected to ground.

The RFID reader 1204 energizes the antenna 1202 to read RFID tags (e.g., in gaming chips) in the vicinity of the antenna 1202. In general, the RFID reader 1204 energizes the antenna 1202 with sufficient energy such that RFID tags inside the antenna 1202 (up to a height of about 6 inches above the gaming table) are read, and RFID tags outside of the antenna 1202 are not read. Otherwise the RFID reader 1204 is similar to the other RFID readers discussed herein (e.g., the RFID reader 108 of FIG. 1, the RFID reader 408*a* of FIG. 4, etc.). The RFID reader 1204 is controlled by the control device 1208, and sends the RFID information it reads from the RFID tags to the control device 1208.

According to one embodiment, the RFID tags are highly tuned with a high Q.

According to another embodiment, the RFID tags have a ferrite core, e.g. as described in U.S. Application Pub. No. 2009/0179741. These ferrite core RFID tags are detuned, with a lower Q than RFID tags lacking the ferrite core. However, when the ferrite core RFID tags are stacked, the ferrite cores carry the magnetic flux upward, increasing the detection height of the topmost RFID tag in the stack.

The network analyzer 1206 detects the reflection coefficient of the antenna 1202, as described in more detail in other sections of this document. More specifically, the network analyzer 1206 detects changes in the reflection coefficient as a human appendage interacts with the antenna 1202. The network analyzer 1206 is otherwise similar to the other network analyzers discussed herein (e.g., the network analyzer 106 of FIG. 1, the network analyzer 406*a* of FIG. 4, etc.). The network analyzer 1206 is controlled by the control device 1208, and sends the reflection coefficients it detects from the antenna 1202 to the control device 1208.

The control device 1208 generally controls the operation of the detection system 1200. The control device may be implemented as a control board (e.g., similar to the control board 104 of FIG. 1), as a computer (e.g., similar to the computer 110 of FIG. 1), or a combination of devices (such as including both a control board and a computer). The control device 1208 controls the RFID reader 1204 to perform a read using the antenna 1202, and controls the network analyzer 1206 to detect the reflection coefficient using the antenna 1202. The control device 1208 controls which one of the RFID reader 1204 and the network analyzer 1206 is connected to the antenna 1202 by sending a control signal to the switch 1210. The control device 1208 may connect to other devices (not shown), for example via a network connection (not shown), and may send the information from the RFID reader 1204 and the network analyzer 1206 to the other devices.

The switch 1210 selects between the RFID reader 1204 and the network analyzer 1206 being connected to the antenna 1202. The switch 1210 is controlled via the control signal from the control device 1208.

The detection system 1200 generally operates as follows. The control device 1208 stores a number of states that are related to the game performed on the gaming table. In a first example state, the control device 1208 monitors activity using both the RFID reader 1204 and the network analyzer 1206, for example by performing 10 detections using the network analyzer 1206 followed by 1 read using the RFID reader 1204. In a second example state, the control device 1208 monitors activity using only the RFID reader 1204. In a third example state, the control device 1208 monitors activity using only the network analyzer 1206. The detection system 1200 then transitions between the states according to the game rules and detected events, such as RFID tag changes (detected by the RFID reader 1204), hand motions (detected by the network analyzer 1206), etc. For example, when the detection system 1200 is in a "waiting for dealer to deal a card" state, the detection system 1200 transitions to the next state upon detecting the dealer's hand interacting with the antenna 1202 (according to its changed reflection coefficient) as the dealer deals the card to a player at the gaming table.

According to an embodiment, the detection system 1200 is configured to detect hand movements within one-half inch of the antenna 1202. As there is generally a layer of felt on the gaming table above the antenna 1202, dealers may be trained to move their hands just above the level of the felt, or in contact with the felt (but still not in contact with the antenna 1202), in order to trigger the detection.

The arrangement of the components of the detection system 1200 may be adjusted as desired in alternative embodiments. As one option, the RFID reader 1204 and switch 1210 may be omitted, in which case the detection system 1200 operates as a geofence system (see, e.g., the geofence antenna 644 of FIG. 6 and the method 1100 of FIG. 11). As another option, the RFID reader 1204 and the network analyzer 1206 may be combined into a single device (see, e.g., the combined RFID reader and network analyzer 308 of FIG. 3), in which case the switch 1210 may be omitted from the detection system 1200. As another option, the detection system 1200 may be one of a number of detection systems on a gaming table, where each antenna is associated with a different seat or betting area; various of the components may be combined and the signals multiplexed, similar to FIG. 4.

Similarly, the number of game states, and the events that trigger changes between the game states, may be adjusted as desired in alternative embodiments. A game state may include sub-states, each with associated events and triggers. A game state may also be associated with location information. For example, consider the game of Blackjack, having a Deal game state in which the dealer deals the cards to each player position. (Each player position is associated with an antenna.) The Deal state includes a number of sub-states associated with the dealer's hand being detected passing over one of the antennas. For example, when the system detects the dealer's hand passing over the antenna for the first player position, the system knows the dealer has dealt a card to that location. When the system detects the dealer's hand passing over the antenna for the second player position, the system knows the dealer has dealt a card to that location. With the addition of an instrumented shoe to read the value of the card that has been dealt, the system then computes the value of each hand dealt to each location.

Figure 13:
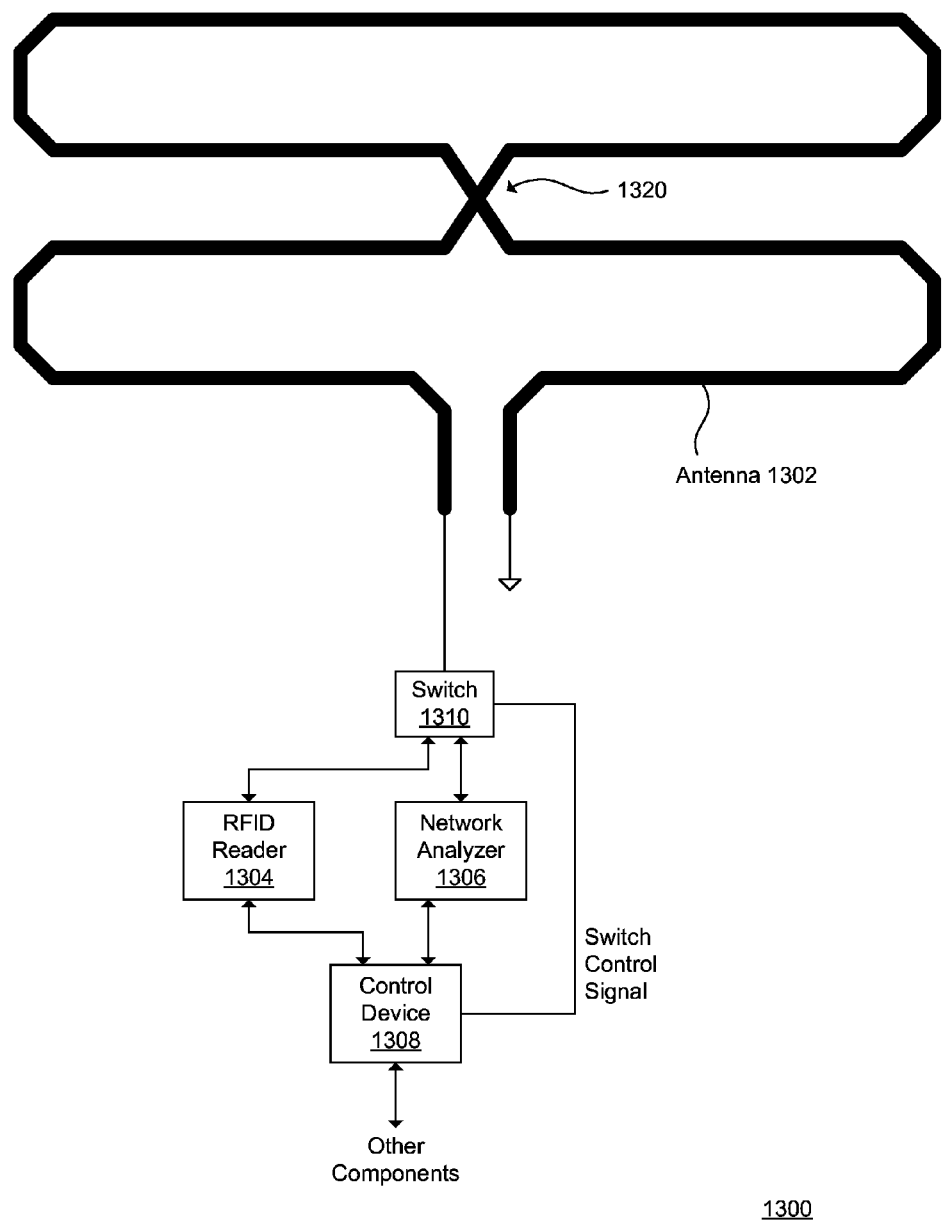
FIG. 13 is a block diagram of a detection system 1300.

FIG. 13 is a block diagram of a detection system 1300. The detection system 1300 is similar to the detection system 1200 (see FIG. 12). The detection system 1300 includes an antenna 1302, an RFID reader 1304, a network analyzer 1306, a control device 1308, and a switch 1310. The RFID reader 1304, the network analyzer 1306, the control device 1308, and the switch 1310 are respectively similar to the RFID reader 1204, the network analyzer 1206, the control device 1208, and the switch 1210 of FIG. 12.

The antenna 1302 is a double loop, FIG. 8 (figure eight) antenna. Note that at point 1320, the connections between the loops do not actually intersect in an X shape; one of the connections passes underneath the other on the circuit board, making a single path from the switch 1310 to the ground connection. As compared to the antenna 1202 (see FIG. 12), the antenna 1302 constrains the magnetic flux to an area that more closely corresponds to the area inside the antenna 1302. Thus, the antenna 1302 is not as sensitive to appendages outside of the antenna 1302, as compared to the antenna 1202.

The antennas 1202 (see FIG. 12) and 1302 (see FIG. 13) have different detection volumes. For the antenna 1202, the magnetic field lines are generally viewed as concentric cylinders around each line of the antenna 1202. Or viewed cross-sectionally from the side, the antenna lines appear as two points, and the magnetic field lines form concentric circles around each point. The density of the magnetic field lines is greater between the lines of the antenna 1202 than outside of the antenna 1202; but since the magnetic field lines do extend outside of the antenna 1202, there is the potential to detect hand movements outside of the antenna 1202.

For the antenna 1302, the magnetic field lines are generally viewed as concentric cylinders concentrated around the inner two lines of the antenna 1302, with only a small amount of magnetic field lines extending outside of the outer two lines of the antenna 1302. Or viewed cross-sectionally from the side, the antenna lines appear as four points; the magnetic field lines form dense concentric ovals around the inner two points, and only a few magnetic field lines form concentric circles around each of the outer two points. As compared to the antenna 1202, the magnetic field lines of the antenna 1302 are more clearly constrained inside the boundary of the antenna 1302.

Figure 14:
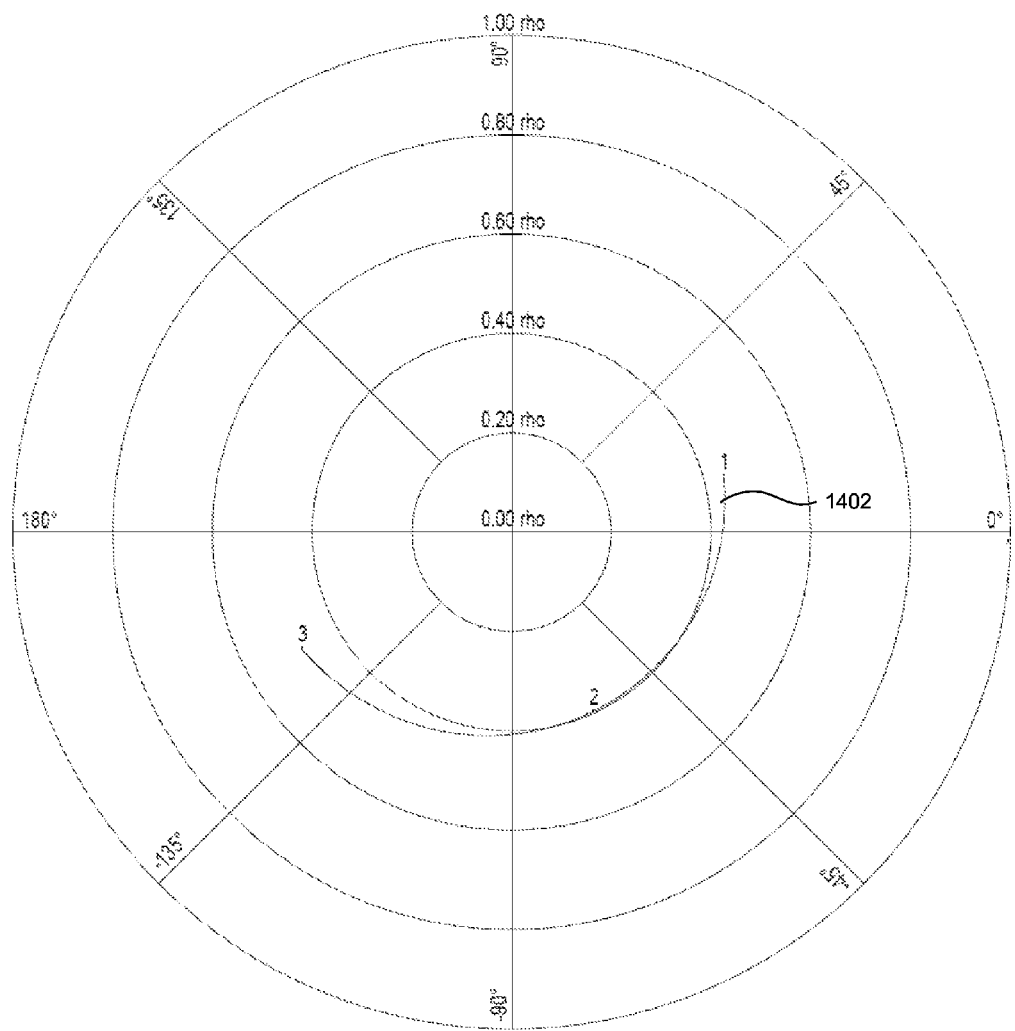
FIG. 14 is a polar diagram showing an example of reflection coefficient measurements by the detection system 1200 (see FIG. 12) when an appendage is not present.

FIG. 14 is a polar diagram showing an example of reflection coefficient measurements by the detection system 1200 (see FIG. 12) when an appendage is not present. The polar diagram shows the line 1402 resulting from the network analyzer 1206 measuring S11, the reflectance of the antenna 1202. The network analyzer 1206 operates between 13.25 MHz and 13.75 MHz, with point "1" corresponding to 13.25 MHz, point "2" corresponding to 13.56 MHz, and point "3" corresponding to 13.75 MHz.

Figure 15:
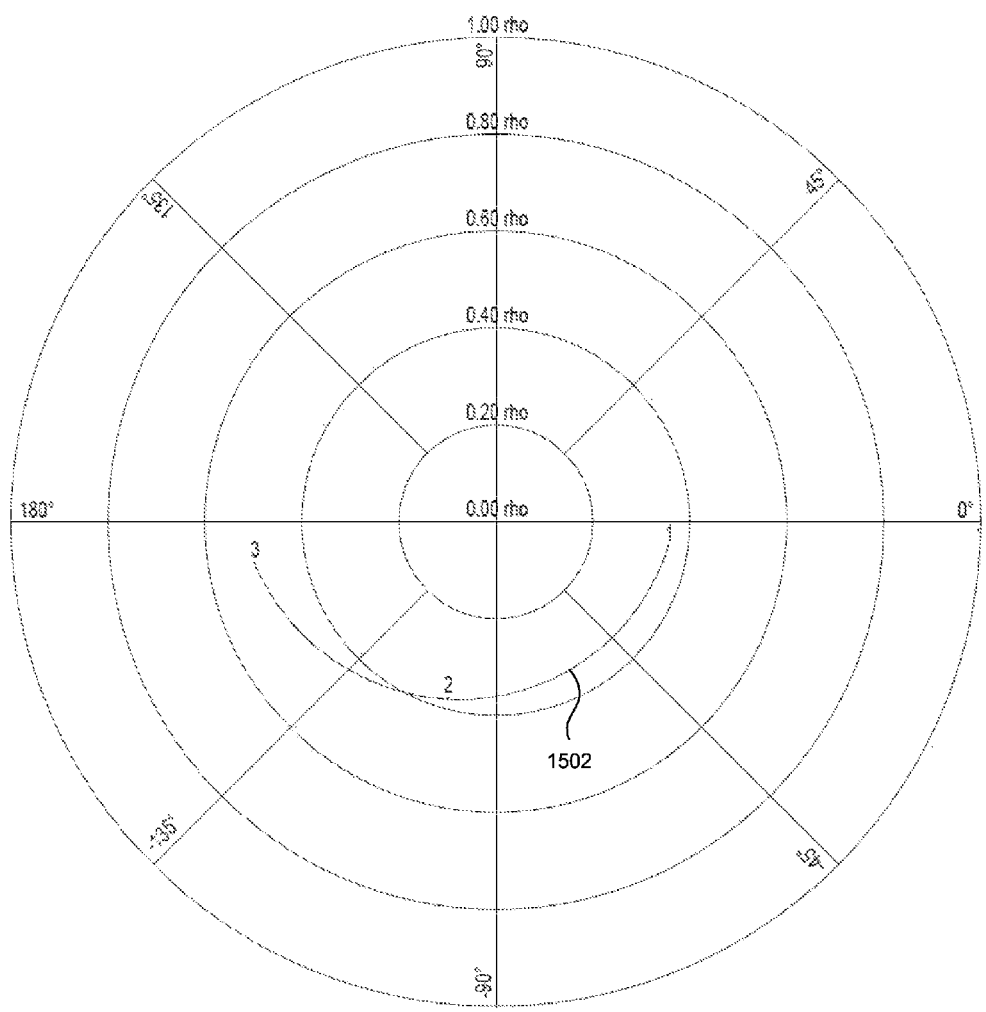
FIG. 15 is a polar diagram showing an example of reflection coefficient measurements by the detection system 1200 (see FIG. 12) when an appendage is present.

FIG. 15 is a polar diagram showing an example of reflection coefficient measurements by the detection system 1200 (see FIG. 12) when an appendage is present. The polar diagram shows the line 1502 resulting from the network analyzer 1206 measuring S11, the reflectance of the antenna 1202. The network analyzer 1206 operates between 13.25 MHz and 13.75 MHz, with point "1" corresponding to 13.25 MHz, point "2" corresponding to 13.56 MHz, and point "3" corresponding to 13.75 MHz.

Note the differing placement on the polar plots between the line 1402 (see FIG. 14) and the line 1502. In general, the line 1502 is shifted clockwise as compared to the line 1402. The control device 1208 may store the set of three points of the line 1402 as the baseline set when no appendage is present, and may store the set of three points of the line 1502 as the appendage detected set. Then as the network analyzer 1206 detects the reflectance at these frequencies, the control device 1208 determines whether an appendage is present by comparing the detected values with the stored sets. For example, when all three of the detected values are closer in rho and theta to line 1502 than to line 1402, the control device 1208 determines that an appendage is present.

Detection Details

To mitigate false detections, it is important to establish the baseline value, to minimize noise, to establish a threshold above the noise level, and to ensure that shifts in I and Q (or rho and theta) due to hand motion exceed the threshold.

The noise can be reduced by averaging. In one embodiment, the reflection coefficients are averaged for 10 milliseconds—a time frame that is very short compared to hand motions. This time period may be increased in order to further reduce transient changes in the detected reflectances.

Noise from proximal RFID systems (e.g., antennas on other boards such as in FIG. 4, multiple antennas on one board as in FIG. 6, etc.) can be minimized by offsetting the detection frequency. For example, instead of looking for reflection coefficients at 13.56 MHz, one embodiment uses 13.25 MHz and another embodiment uses 13.75 MHz. Different frequencies, or additional frequencies (e.g., four or more) may be used to provide more accurate detection results.

In one embodiment, the detection system measures the reflected I and Q levels every 0.8 msec and compares this to a threshold which was set to a distance 0.02 of the unit circle. We measured I and Q at 3 frequencies, 13.6, 13.7, and 13.9 MHz. If any of these moved by more than the threshold, the detection system detected an appendage.

Short Term Calibration

The detection system 1200 of FIG. 12 uses one antenna 1202 for both RFID and reflection coefficient measurements. (Other systems may also have this feature, such as the detection system 1300 of FIG. 13, the system 100 of FIG. 1, the system 300 of FIG. 3, etc.) In such a case, there is the potential for RFID tags to be placed nearby the antenna 1202 for an extended period, for example as a bet placed for the entire duration of a game. In such a case, the RFID tags may affect the reflectance of the antenna 1202, yet we still want to detect hand movements within the game.

An embodiment adds a high pass filter to address this issue. The high pass filter may be added as a filtering function by the control device (e.g., the control device 1208 of FIG. 12). The filtering period may be set at, for example, 1 second. If the detection system detects a change in the reflectance of the antenna 1202, and the change remains for longer than the filtering period, the result is not reported as a hand movement. Instead, the detection system 1200 uses the changed reflection coefficients as a new baseline; when a hand moves over the antenna 1202, the detection system 1200 then detects the hand motion due to a further change in the reflectance from the new baseline.

Long Term Calibration

The detection system 1200 of FIG. 12 (or the detection system 1300 of FIG. 13, etc.) may also perform recalibration of the baseline reflectances over a longer period than discussed above. The reflectance of an antenna may change over time, for example due to temperature, humidity, etc. The system may perform this process in the background so that it does not degrade the performance of the system. First (1), the system uses the RFID reader (e.g., the RFID reader 1204) to read an antenna, in order to determine that no gaming objects are coupled to the antenna. Second (2), the system uses the network analyzer (e.g., the network analyzer 1206) to obtain the reflection coefficient at a first frequency. Third (3), the system uses the RFID reader (e.g., the RFID reader 1204) to read the antenna again; if the RFID reader detects gaming objects, then the reflection coefficient is discarded. Fourth (4), the system performs the steps (1)-(3) again five more times, to result in six measurements for the baseline reflection coefficients. Fifth (5), the system discards the two measurements that are furthest away from the current baseline, and averages the remaining four measurements. Sixth (6), the system performs the steps (1)-(5) for a second frequency. Seventh (7), the system performs the steps (1)-(5) for a third frequency. Eighth (8), the system stores this set of three reflection coefficients as the baseline for that antenna 1202.

Blackjack Example

This example refers to the detection system 1200 of FIG. 12. It is also applicable to the detection system 1300 (see FIG. 13), as well as the other geofence detection systems described in other sections (e.g., the geofence antenna 644 of FIG. 6, the method 1100 of FIG. 11, etc.). In this example, the Blackjack table has one antenna 1202 for each player position (and typically seven player positions), and another antenna 1202 for the dealer position.

Blackjack is one of several table games in which players get to decide whether or not to take extra cards. To properly track wins and losses, it is imperative to know who received what cards. Different rules apply at different points in a game. Thus it is important to define each of these rules by "game state" and further to define transitions from one game state to the next.

A game of Blackjack may be divided into five states: New Game, Bets Locked, Deal, Play, and Showdown/Payout. Within the Deal state, events such as Insurance and Dealer Blackjack may occur. Within the Play state, events such as Surrender, Hit, Bust, Splits, and Double Down may occur. In the Showdown/Payout state, the dealer displays the dealer's hand and then performs seat by seat reconciliation and payout.

Within the New Game state, the detection system 1200 does not need to monitor dealer hand motions. The control device 1208 may control the RFID reader 1204 to read, in order to monitor bet placements.

Within the Bets Locked state, the detection system 1200 does not need to monitor dealer hand motions. The control device 1208 may control the RFID reader 1204 to read, in order to identify changes in the RFID tags (e.g., changes in the bet amounts due to chips being added, removed or moved around) and to trigger an alert.

In the Deal state, the dealer deals 2 cards to each player according to completely prescribed motions; the detection system 1200 has no need to monitor dealer hand motions. The control device 1208 may control the RFID reader 1204 to read, in order to identify changes in the RFID tags (e.g., changes in the bet amounts) and to trigger an alert. Alternatively, the detection system 1200 may monitor dealer hand motions in order to verify that the dealer is dealing the cards in the prescribed manner (e.g., to the correct player positions, etc.).

In the Play state, the detection system 1200 monitors both the dealer's hand motions as well as the RFID tags (gaming tokens). The detection system 1200 uses the network analyzer 1206 to detect the hand motions, and uses the RFID reader 1204 to read the RFID tags. When the RFID reader 1204 detects changes in the RFID tags, the detection system 1200 can generate an alert. When the detection system 1200 detects a hand motion at the antenna 1202 for a particular player position (or for the dealer position), the detection system 1200 knows that the dealer has dealt a card to that particular player position (or to the dealer position). By using an instrumented shoe, the detection system 1200 also knows which card was dealt to that particular player position (or to the dealer position).

Within the Play state, the steps below are repeated for all players at the table. When the last player has finished all the steps within the Play state, the dealer shows his "hole" card and Showdown/Payout begins. (The actual trigger to begin Showdown/Payout may be something else, for example when the dealer's hand is sensed again using the antenna 1202 at the first player position.)

For example:

Surrender: If a player made an insurance bet (typically ½ the original bet), the detection system 1200 tracks whether the insurance bet won or lost, and whether the dealer correctly collected or paid out the insurance bet. If the detection system 1200 detects a dealer error when processing the insurance bet, the detection system 1200 generates an alert.

Hit: If there is no change in bets, and a card is drawn, and the hand is detected at Player #1, the detection system 1200 now knows the value of their hand. The detection system 1200 knows whether or not they busted or won (even though the dealer hand will not be exposed until Showdown/Payout). The detection system 1200 also knows what "normal strategy" should be given what a player was dealt, for example by storing strategy information in one of the databases 130 (see FIG. 1). The ability to compare "normal" strategy with actual player behavior is of value in rating a player's skills.

Split: If a player has identical cards, and the detection system 1200 detects a second bet placed adjacent to the original bet (as a separate bet), the detection system 1200 determines that it must be a Split. In this case, the player will receive additional cards (how many depends on a number of detailed rules). Sensing dealer hand motions for each card is critical. The detection system 1200 may infer how to assign each dealt card to one of the two (or more) split hands.

Double Down: If the base bet is doubled (on the same spot as the base bet), the player will receive a single additional card. Monitoring hand position when dealing this single card is not critical, but the detection system 1200 may monitor it in order to confirm the player's decision (and to generate an alert if it detects the card is dealt to the incorrect player position).

According to an embodiment, the detection system 1200 includes an instrumented shoe (to determine the value of the card dealt) as well as a number of antennas 1202 (to determine where each card was dealt). Using this information and a game strategy database (e.g., stored in the databases 130 of FIG. 1) enables the detection system 1200 to rate the skill level of each player. The detection system 1200 also uses the RFID reader 1204 to read the RFID tags in the gaming tokens and to determine the value of bets placed by each player, for example by using a chip database (e.g., stored in the databases 130 of FIG. 1). The detection system 1200 can then use the player's strategy information and bet information in order to determine comps earned, using a comps database (e.g., stored in the databases 130 of FIG. 1).

The Showdown/Payout state includes a logical component and a tactical component. In Showdown (logical), after the dealer reveals his "hole" card, the logical game state changes from Play to Payout. The dealer then services each player in sequence to either (1) collect losing bets or (2) payout winning bets. This reconciliation takes place player by player.

In Showdown (tactical), with the dealer focused on the player he is servicing, his attention will not be on other "downstream" players. With the outcome of the game known, there is a temptation for some players to move/remove their losing bets. Thus, it is desirable to transition to Payout mode "seat by seat". In other words take the example where:

Player 1 has been serviced (losses collected; payouts made). That player position is now in New Game state.

Player 2 is being serviced. The dealer hand has been detected and Player 2 is in Payout state. All losing bets get collected first. Payouts for each bet are in sequence. In some cases, it is possible to tie each individual payout to each winning bet. In the case of Blackjack, this can be difficult (chaotic payout schemes)—but at a minimum—the detection system 1200 can project and verify the overall net of wins/losses.

Players 3 through 7 have yet to be serviced. These players remain in the Play state—where any changes in bets can trigger alarms.

When the dealer's hand is detected at Player 3, the game state for Player 2 changes from Payout to New Game, and for Player 3 changes from Play to Payout.

When the last player is serviced, the entire table is in New Game state.

The above number of states may be increased or decreased as desired, in order to adjust the granularity of monitoring performed. In a similar manner, states may be defined for other casino games, and the rules of the game parsed in order to define the events that trigger changes between the game states, and to define the errors to detect and to generate alerts.

Figure 16:
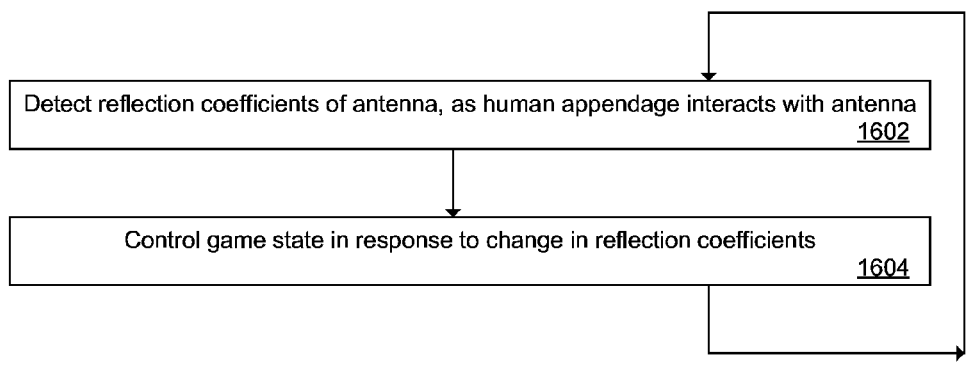
FIG. 16 is a flowchart of a method 1600 of detecting events in a gaming environment.

FIG. 16 is a flowchart of a method 1600 of detecting events in a gaming environment. The method 1600 may be performed by the detection system 1200 (see FIG. 12), the detection system 1300 (see FIG. 13), the system 100 (see FIG. 1), the system 300 (see FIG. 3), the system 400 (see FIG. 4), the system 500 (see FIG. 5), etc. For example, the control device 1208 (see FIG. 12) may execute a computer program that controls the components of the detection system 1200 to perform the method 1600.

At 1602, a plurality of reflection coefficients are detected. The reflection coefficients are associated with an antenna positioned on a gaming table. The reflection coefficients change as a human appendage interacts with the antenna. For example, the network analyzer 1206 (see FIG. 12) may detect the reflection coefficients associated with the antenna 1202. The reflection coefficients may be obtained at one or more frequencies. As an example, the network analyzer 1206 may detect at one frequency, and the measured reflection coefficients change from one value (when the appendage is not present) to another value (when the appendage is present). As another example, the network analyzer 1206 may detect at three frequencies (see FIGS. 14-15), and one or more of the measured reflection coefficients each change from one value (when the appendage is not present) to another value (when the appendage is present).

At 1604, a game state related to the gaming table in the gaming environment is controlled in response to the change in the plurality of reflection coefficients. For example, the control device 1208 (see FIG. 12) may control the game state in response to the change in the reflection coefficients.

In this manner, the detected hand movements may be used to control the state of the game being performed on the gaming table.

The method 1600 may include other steps in additional embodiments. One additional embodiment is as follows. First, the antenna is selectively energized. For example, the control device 1208 (see FIG. 12) may control the RFID reader 1204 to selectively energize the antenna 1202. Second, a plurality of identifiers of a plurality of RFID tags that are nearby to the antenna are read. For example, the RFID reader 1204 may read the identifiers of RFID tags that are stacked on the gaming table inside of the antenna 1202. Then, 1604 is modified such that the game state is controlled in response to the change in the plurality of reflection coefficients and the plurality of identifiers. For example, if the game is in Game State 1 and only a hand movement is detected, the game transitions to Game State 2; if only RFID tags are detected, the game transitions to Game State 3; and if both a hand movement and RFID tags are detected, the game transitions to Game State 4.

Another additional embodiment is as follows. First, a baseline set of reflection coefficients are stored. For example, the control device 1208 may store the baseline set in a memory (e.g., in a database). Second, a new baseline set of reflection coefficients are periodically acquired. For example, the control device 1208 may control the network analyzer 1206 to detect the reflection coefficients when a game is not in progress (e.g., between games). Third, the baseline set of reflection coefficients are updated with the new baseline set of reflection coefficients. For example, the control device 1208 may update the database to reflect the new baseline set.

Another additional embodiment is as follows. The gaming table may include a number of antennas, where each antenna is associated with a player position at the table. The system may perform the method 1600 for each of the antennas concurrently. In this manner, the system may discretely track the game state (or sub-states within a game state) for each player position.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A system for detecting events in a gaming environment, comprising:
   a plurality of antennas positioned on a gaming table;
   a network analyzer device, coupled to the antenna, that is configured to detect a plurality of reflection coefficients that are associated with the plurality of antennas, wherein the plurality of reflection coefficients includes a plurality of phase information, wherein the plurality of reflection coefficients change as a human appendage interacts with one of the plurality of antennas; and
   a control device, coupled to the network analyzer device, that is configured to control a game state related to the gaming table in the gaming environment in response to the change in the plurality of reflection coefficients for the one of the plurality of antennas.

2. The system of claim 1, wherein the plurality of reflection coefficients change from a first state to a second state when the human appendage moves from outside the one of the plurality of antennas to inside the one of the plurality of antennas.

3. The system of claim 1, wherein the plurality of reflection coefficient change from a second state to a first state when the human appendage moves from inside the one of the plurality of antennas to outside the one of the plurality of antennas.

4. The system of claim 1, wherein the plurality of reflection coefficients change from a first state to a second state when the human appendage moves from outside the one of the plurality of antennas to inside the one of the plurality of antennas, wherein the plurality of reflection coefficient change from the second state to the first state when the human appendage moves from inside the one of the plurality of antennas to outside the one of the plurality of antennas, and wherein the control device controls the game state according to the plurality of reflection coefficients switching between the first state and the second state.

5. The system of claim 1, wherein the human appendage interacts with the one of the plurality of antennas by passing over the one of the plurality of antennas on the gaming table.

6. The system of claim 1, wherein the plurality of reflection coefficients change as the human appendage and an object interact with the one of the plurality of antennas, wherein a gaming object includes the object.

7. The system of claim 1, further comprising:
a radio frequency identification (RFID) reader device that is configured to selectively energize the one of the plurality of antennas and to read a plurality of identifiers of a plurality of RFID tags that are nearby to the one of the plurality of antennas, wherein the control device is configured to control the game state in response to the change in the plurality of reflection coefficients and the plurality of identifiers.

8. The system of claim 1, wherein the control device stores a baseline set of reflection coefficients, wherein the control device periodically controls the network analyzer to acquire a new baseline set of reflection coefficients, and wherein the control device updates the baseline set of reflection coefficients with the new baseline set of reflection coefficients.

9. The system of claim 1, wherein the network analyzer device operates between 13 and 14 MHz.

10. The system of claim 1, wherein the game state is one of a plurality of game states, wherein the plurality of antennas are respectively associated with a plurality of locations, and wherein the control device is configured to associate each of the plurality of locations with a corresponding one of the plurality of game states in response to the change in the plurality of reflection coefficients for a corresponding one of the plurality of antennas.

11. A method of detecting events in a gaming environment, comprising:
detecting a plurality of reflection coefficients that are associated with a plurality of antennas positioned on a gaming table, wherein the plurality of reflection coefficients includes a plurality of phase information, wherein the plurality of reflection coefficients change as a human appendage interacts with one of the plurality of antennas; and
controlling a game state related to the gaming table in the gaming environment in response to the change in the plurality of reflection coefficients for the one of the plurality of antennas.

12. The method of claim 11, further comprising:
selectively energizing the one of the plurality of antennas; and
reading a plurality of identifiers of a plurality of RFID tags that are nearby to the one of the plurality of antennas,
wherein controlling the game state comprises controlling the game state in response to the change in the plurality of reflection coefficients and the plurality of identifiers.

13. The method of claim 11, further comprising:
storing a baseline set of reflection coefficients;
periodically acquiring a new baseline set of reflection coefficients; and
updating the baseline set of reflection coefficients with the new baseline set of reflection coefficients.

14. A method of detecting events in a gaming environment, comprising:
detecting a plurality of reflection coefficients that are associated with a plurality of antennas positioned on a gaming table, wherein the plurality of antennas are respectively associated with a plurality of locations on the gaming table, wherein the plurality of reflection coefficients includes a plurality of phase information, and wherein the plurality of reflection coefficients change as a human appendage interacts with one of the plurality of antennas; and
controlling a plurality of game states related to the gaming table in the gaming environment in response to the change in the plurality of reflection coefficients, wherein each of the plurality of locations is associated with a corresponding one of the plurality of game states in response to the change in the plurality of reflection coefficients for the one of the plurality of antennas.

15. The system of claim 1, wherein the plurality of reflection coefficients includes the plurality of phase information and a plurality of magnitude information.

16. The system of claim 1, wherein the plurality of reflection coefficients includes one of a plurality of polar values, a plurality of rho and theta values, a plurality of x and y values, a plurality of in-phase (I) and quadrature (Q) values, and a plurality of scattering parameters.

17. The system of claim 1, wherein the control device is configured to control the game state in response to a change in the plurality of phase information.

18. The system of claim 1, wherein the control device is configured to control the game state in response to a change in the plurality of phase information and a plurality of magnitude information.

19. The system of claim 1, wherein the network analyzer device drives the antenna using a magnetic field.

20. The system of claim 1, wherein the plurality of reflection coefficients are associated with a magnetic field of the antenna.

21. The system of claim 1, wherein when the human appendage interacts with the one of the plurality of antennas, the reflection coefficients associated with the one of the plurality of antennas change by shifting clockwise on a polar plot.

22. The system of claim 1, wherein when the human appendage interacts with the one of the plurality of antennas, the reflection coefficients associated with the one of the plurality of antennas change, at 13.25 MHz, from a theta between 0 and 45 degrees to a theta between −45 and 0 degrees.

23. The system of claim 1, wherein when the human appendage passes over the one of the plurality of antennas, the reflection coefficients associated with the one of the plurality of antennas change, and the reflection coefficients associated with other of the plurality of antennas do not change.

24. The system of claim 1, wherein the plurality of antennas are associated with a plurality of positions on the gaming table, wherein when the human appendage passes over the one of the plurality of antennas, the reflection coefficients associated with the one of the plurality of antennas change, and the reflection coefficients associated with other of the plurality of antennas do not change,
wherein the control device controls the game state associated with one of the plurality of positions associated with the one of the plurality of antennas by associating a dealt card with the one of the plurality of positions.

* * * * *